United States Patent
Miura et al.

(10) Patent No.: US 7,817,404 B2
(45) Date of Patent: Oct. 19, 2010

(54) CAPACITOR AND METHOD FOR MANUFACTURING SAME

(75) Inventors: Teruhisa Miura, Kyoto (JP); Kazuhiro Murakami, Osaka (JP); Masayuki Shinjou, Kyoto (JP); Toshiyuki Kitagawa, Kyoto (JP); Shusaku Kawasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 528 days.

(21) Appl. No.: 11/884,841

(22) PCT Filed: Apr. 18, 2006

(86) PCT No.: PCT/JP2006/308099

§ 371 (c)(1),
(2), (4) Date: Aug. 22, 2007

(87) PCT Pub. No.: WO2006/115111

PCT Pub. Date: Nov. 2, 2006

(65) Prior Publication Data

US 2009/0122468 A1    May 14, 2009

(30) Foreign Application Priority Data

| Apr. 20, 2005 | (JP) | ............................. 2005-122070 |
| Dec. 13, 2005 | (JP) | ............................. 2005-358760 |
| Dec. 13, 2005 | (JP) | ............................. 2005-358762 |
| Dec. 13, 2005 | (JP) | ............................. 2005-358764 |

(51) Int. Cl.
*H01G 9/10* (2006.01)
*H05K 5/06* (2006.01)

(52) U.S. Cl. .................................... 361/518; 29/25.03
(58) Field of Classification Search .................. 361/502, 361/503, 517–520; 29/25.03
See application file for complete search history.

(56) References Cited

U.S. PATENT DOCUMENTS

| 6,222,720 B1 | 4/2001 | Aoki et al. |
| 7,365,962 B2 * | 4/2008 | Miura et al. ................. 361/537 |
| 2006/0034036 A1 | 2/2006 | Miura et al. |

FOREIGN PATENT DOCUMENTS

| JP | 10-275751 | 10/1998 |
| JP | 11-219857 | 8/1999 |
| JP | 11-243035 | 9/1999 |
| JP | 2000-315632 | 11/2000 |
| WO | WO 2004/084246 A1 | 3/2004 |

OTHER PUBLICATIONS

Chinese Office Action issued in Chinese Application No. 200680012894, dated Aug. 21, 2009.

* cited by examiner

*Primary Examiner*—Eric Thomas
(74) *Attorney, Agent, or Firm*—McDermott Will & Emery LLP

(57) ABSTRACT

A capacitor includes a metal case having an opening, a capacitor element accommodated in the metal case, an electrolyte accommodated in the metal case, and a sealing rubber sealing the opening of the metal case. The sealing rubber seals the opening of the metal case while the sealing rubber is compressed to have a stress applied thereto. The stress is not lower than 0.5 MPa and not higher than a predetermined maximum value. This capacitor prevents the electrolyte from leaking, thus having high reliability.

35 Claims, 25 Drawing Sheets

Fig. 3

| Material of Sealing Rubber | Compression Rate (%) | Maximum Value of Stress (MPa) | Elongation Rate (%) | Evaluation Result |
|---|---|---|---|---|
| EPT Rubber | 5.0 | 0.13 | 107 | A |
| | 10.0 | 0.26 | 113 | A |
| | 15.0 | 0.39 | 120 | A |
| | 18.0 | 0.47 | 124 | B |
| | 20.0 | 0.52 | 126 | B |
| | 25.0 | 0.66 | 133 | B |
| | 30.0 | 0.79 | 139 | B |
| | 35.0 | 0.92 | 146 | B |
| | 40.0 | 1.05 | 152 | C |
| IIR Rubber | 2.5 | 0.30 | 103 | A |
| | 4.0 | 0.47 | 105 | B |
| | 5.0 | 0.59 | 107 | B |
| | 10.0 | 1.18 | 113 | B |
| | 20.0 | 2.36 | 126 | B |
| | 50.0 | 5.90 | 166 | B |
| | 70.0 | 8.26 | 192 | B |
| | 80.0 | 9.44 | 205 | C |

Fig. 28  *Prior Art*
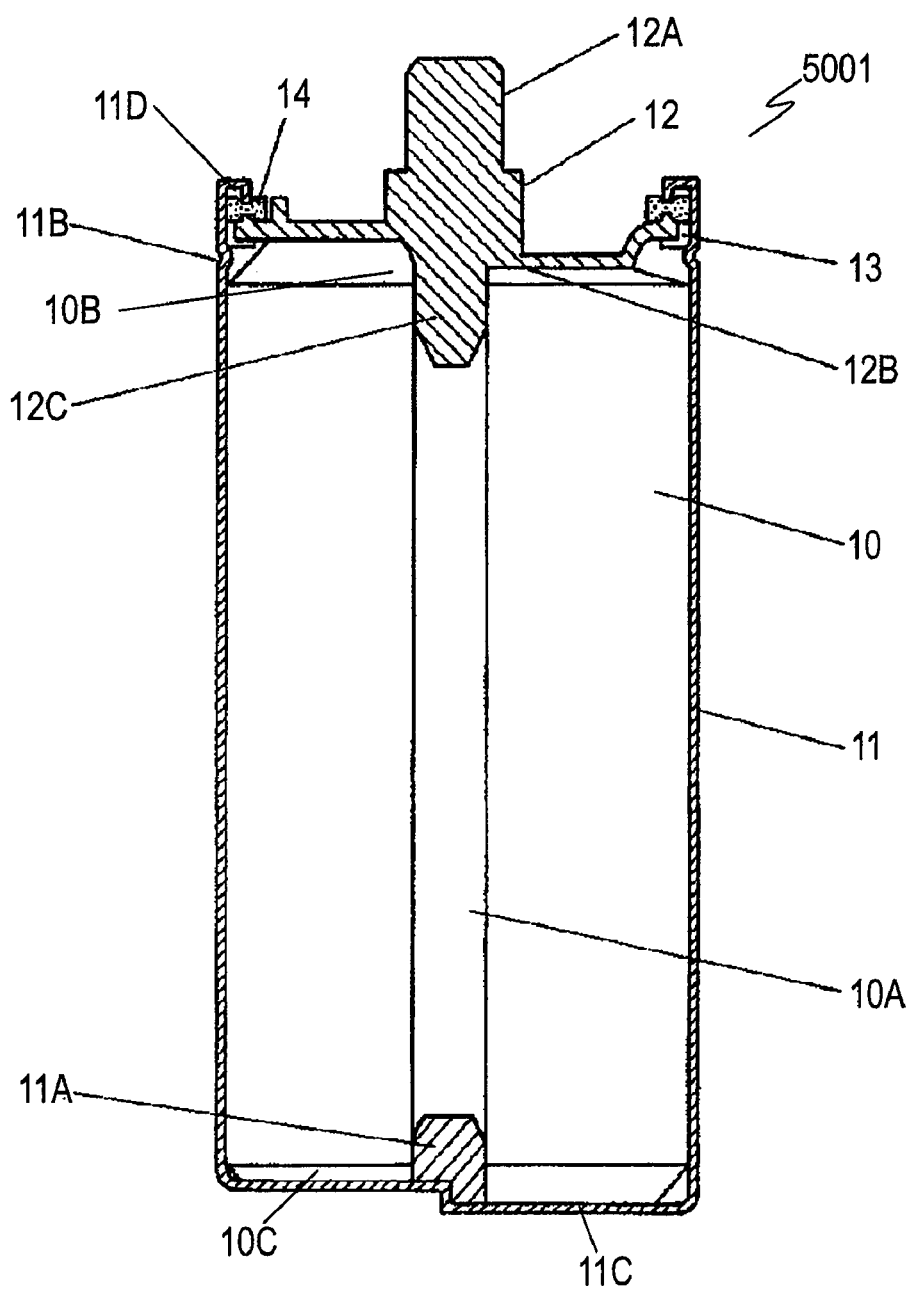

Fig. 29   *Prior Art*
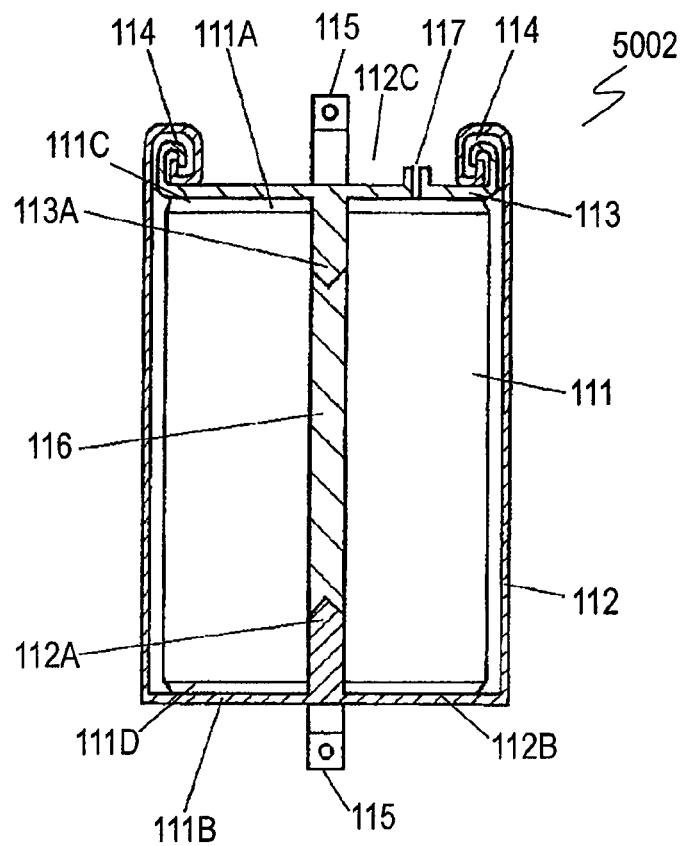
Fig. 30   *Prior Art*
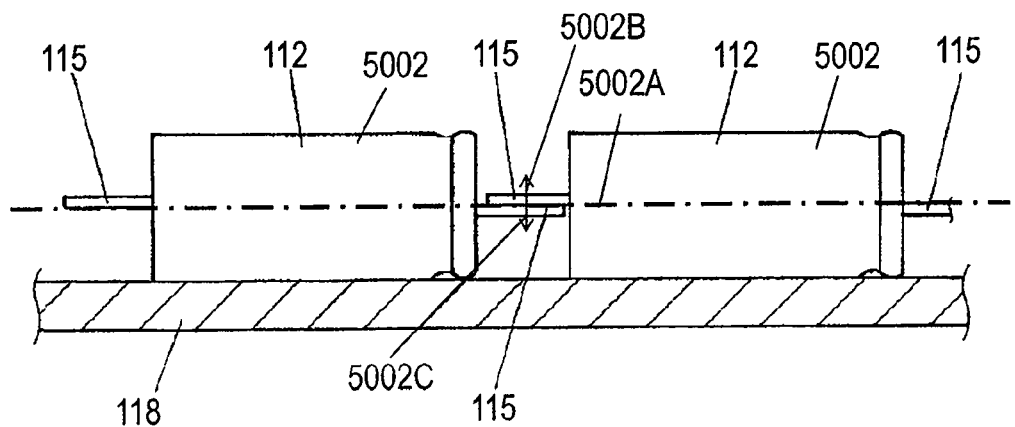

Fig. 31  *Prior Art*
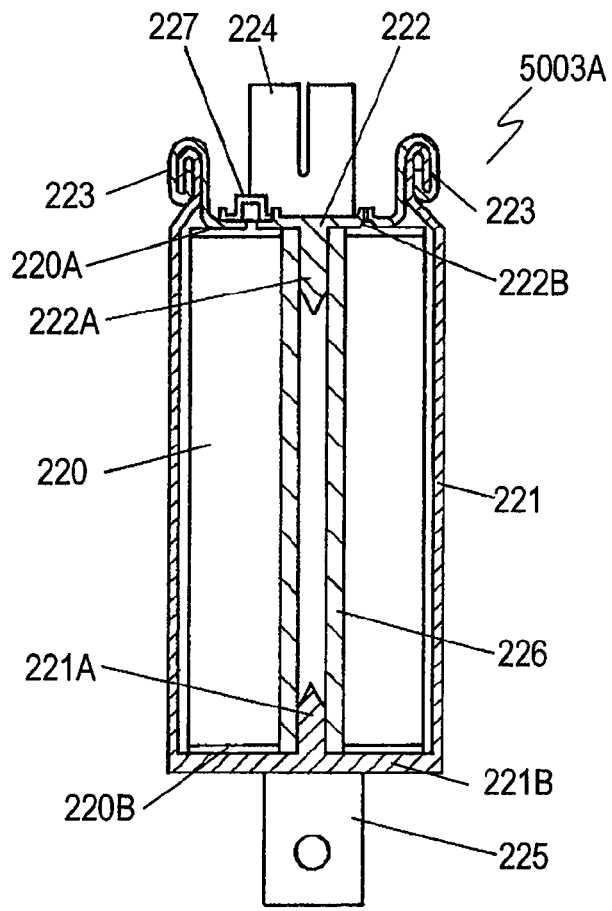
Fig. 32  *Prior Art*
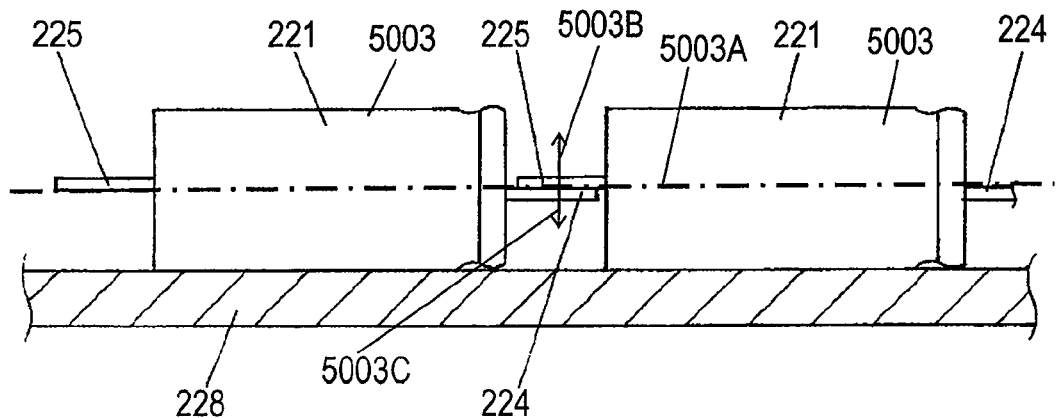

Fig. 33   *Prior Art*
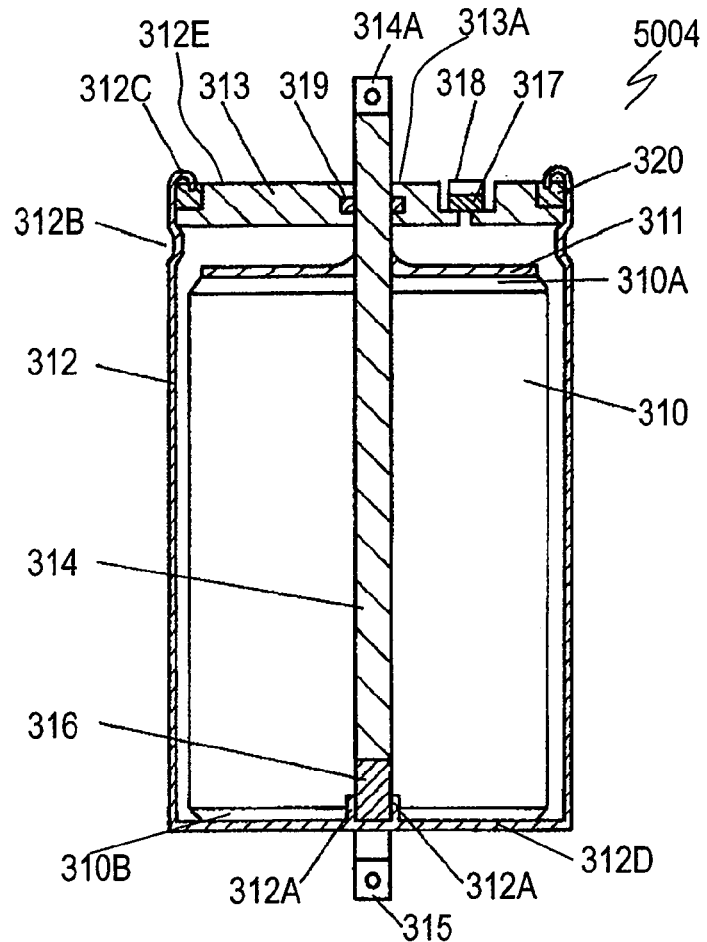
Fig. 34   *Prior Art*
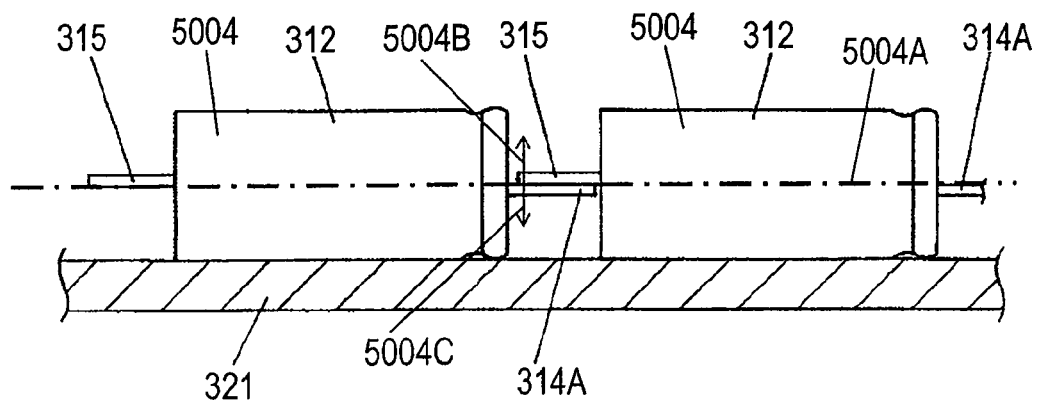

CAPACITOR AND METHOD FOR MANUFACTURING SAME

RELATED APPLICATIONS

This application is the U.S. National Phase under 35 U.S.C. §371 of International Application No. PCT/JP2006/308099, filed on Apr. 18, 2006, which in turn claims the benefit of Japanese Application No. 2005-122070, filed on Apr. 20, 2005, Japanese Application No. 2005-358760, filed on Dec. 13, 2005, Japanese Application No. 2005-358762, filed on Dec. 13, 2005 and Japanese Application No. 2005-358764, filed on Dec. 13, 2005, the disclosures of which Applications are incorporated by reference herein.

TECHNICAL FIELD

The present invention relates to a capacitor and a method of manufacturing the capacitor.

BACKGROUND ART

Capacitors have widely been used in various electronic components, backup or recovery power sources, and power storages for hybrid automobiles or fuel cell vehicles.

FIG. 28 is a cross sectional view of a conventional capacitor 5001. A capacitor element 10 includes collectors made of aluminum foil and a pair of positive and negative electrodes having polarized layers on the collectors, respectively. The pair of electrodes deviate from each other in opposite directions and rolled with a separator provided between the electrodes, thus providing the capacitor element 10. A positive electrode and a negative electrode are connected with end surfaces 10B and 10C of the capacitor element 10, respectively. The capacitor 10 has a hollow 10A provided in the center thereof.

The capacitor element 10 is accommodated together with an electrolyte in a cylindrical metal case 11 which is made of aluminum and which has a bottom 11C. A projection 11A is provided unitarily with the bottom 11C of the metal case 11 so that the projection 11A is engaged into the hollow 10A of the capacitor element 10. The end surface 10C of the negative electrode of the capacitor element 10 is joined mechanically and electrically to the bottom 11C of the metal case 11 by a joining method, such as laser welding. The metal case 11 has a narrowed portion 11B having a cross-section having a V-shape, and thus, has a locally small diameter at the narrowed portion 11B. The narrowed portion 11B holds a rim of the end surface 10B of the capacitor element 10 from outside.

A positive terminal 12A for external connection is formed unitarily with an outer surface of a terminal plate 12. An inner surface of terminal plate 12 has a joining region 12B having the end surface 10B of the capacitor element 10 joined thereto. A projection 12C of the terminal plate 12 is engaged into the hollow 10A of the capacitor element 10. The end surface 10B of the capacitor element 10 is joined mechanically and electrically to the joining region 12B of the terminal plate 12 by a joining method, such as laser welding.

An insulating ring 13 having a ring shape is provided on an upper part of the narrowed portion 11B of the metal case 11. The insulating ring 13 extends from between an inner surface of the metal case 11 and an outer side surface of the terminal plate 12 to a portion of a rim of an inner surface of the terminal plate 12 for electrically insulating the terminal plate 12 from the metal case 11.

A sealing rubber 14 having a ring shape made of insulating rubber is provided on a rim of an outer surface of the terminal plate 12. An upper end of the metal case 11 is curled together with the sealing rubber 14 at the opening 11D (by a curling process) so as to allow the terminal plate 12 to seal the metal case 11.

The metal case 11 of the conventional capacitor 5001 is sealed mechanically. The capacitor element 10 generates heat during its use under hostile atmosphere or conditions or during a life durability test. This heat raises the temperature of the electrolyte and the pressure in the metal case 11, and may consequently cause the electrolyte to leak from the metal case 11.

FIG. 29 is a cross-sectional view of another conventional capacitor 5002 disclosed in Japanese Patent Laid-pen Publication No. 2000-315632. A capacitor element 111 includes collectors made of aluminum foil and a pair of positive and negative electrodes having polarized layers provided on the collectors, respectively. The pair of electrodes deviate from each other in opposite directions and rolled together with a separator between the electrodes, thus providing the capacitor element 111. A positive electrode and a negative electrode are connected with portions 111A and 111B of the collectors exposing at end surfaces 111C and 111D of the capacitor element 111, respectively.

The capacitor element 111 is accommodated together with an electrolyte in a cylindrical metal case 112 which is made of aluminum and has a bottom 112B thereof. A projection 112A is provided unitarily with the bottom 112B of the metal case 112 for positioning and fixing the capacitor element 111. A sealing plate 113 is joined to the end surface 111C of the capacitor element 111 so as to seal an opening 112C of the metal case 112. A projection 113A is provided on the sealing plate 113 for positioning and fixing the capacitor element 111. The capacitor 5002 further includes an insulator 114, terminals 115 for external connection, and a core 116 which has a bar shape and is provided at the center of the capacitor element 111. The sealing plate 113 has a communication aperture 117 provided therein for supplying the electrolyte.

In the conventional capacitor 5002, the metal case 112 and the sealing plate 113 function as collectors.

FIG. 30 illustrates plural capacitors 5002 connected to each other. The terminals 115 of the capacitor 5002 deviate in directions 5002B and 5002C opposite to each other with respect to a center axis 5002A of the metal case 112. This arrangement of the capacitors 5002 allows the terminals 115 joined onto each other at the center axis 5002A of the metal case 112. Even if the capacitors 5002 are mounted onto an upper surface of a board 118, any one of the capacitors 5002 does not apart from the board 118, and thus, the capacitors 5002 are connected to each other accurately, hence providing a capacitor unit.

In the conventional capacitor 5002, if the sealing plate 113 is connected to the positive electrode of the capacitor element 111, the sealing plate 113 and the metal case 112 becomes a positive terminal and a negative terminal, respectively.

The sealing plate 113 of the positive terminal and the metal case 112 of the negative terminal are electrically insulated from each other with the insulator 114. The distance between the sealing plate 113 and the metal case 112 is extremely small, accordingly causing the short-circuit between the positive and negative terminals due to water drops condensed depending on the environment of usage. Then, electric charges stored in the metal case 112 is consumed at the position where the short-circuit occurs, thereby preventing the capacitor from functioning.

FIG. 31 is a cross sectional view of a further conventional capacitor 5003 disclosed in Japanese Patent Laid-Open Publication No. 2000-315632. A capacitor element 220 includes collectors made of aluminum foil and a pair of positive and negative electrodes having polarized layers provided on the collectors, respectively. The electrodes deviate from each other in opposite directions and rolled with a separator provided between the electrodes, thus providing the capacitor element 220. A positive electrode and a negative electrode are connected with end surfaces 220A and 220B of the capacitor element 220, respectively.

The capacitor element 220 is accommodated together with an electrolyte in a cylindrical metal case 221 made of aluminum. The metal case has a bottom 221B. A projection 221A having a cross section having a polygonal shape is formed unitarily with the bottom 221B of the metal case 221 for positioning and fixing the capacitor element 220. The end surface 220B of the capacitor element 220 is joined to the bottom 221B of the metal case 221.

A sealing plate 222 made of aluminum is joined to the end surface 220A of the capacitor element 220. The sealing plate 222 has a projection 222A having a cross section of the polygonal shape provided on an inner surface of the sealing plate for positioning and fixing the capacitor element 220. A portion 223 of the sealing plate 222 is subjected to an alumite process. The capacitor 5003 further includes a terminal 224 having a planer shape and having an aperture provided therein for external connection, a terminal 225 having a planer shape and having an aperture provided therein for external connection, a core 226 having a bar shape provided at the center of the capacitor element 220, and a pressure control valve 227. The core 226 has a hollow therein. The sealing plate 222 has a communication aperture 222B provided therein for feeding the electrolyte.

The capacitor element 220 of the conventional capacitor 5003 has one electrode connected to the terminal 224 joined to sealing plate 222, and has another electrode connected to the terminal 225 joined to the metal case 221.

FIG. 32 illustrates plural capacitors 5003 connected to each other. The terminals 224 and 225 of the planer shapes of the capacitor 5002 deviate in directions 5003B and 5003C opposite to each other with respect to a center axis 5003A of the metal case 221. This arrangement of the capacitors 5003 allows the terminals 224 and 225 joined onto each other at the center axis 5003A of the metal case 221. Even if the capacitors 5003 are mounted onto an upper surface of a board 228, any one of the capacitors 5003 does not apart from the board 228, and thus, the capacitors 5003 are connected to each other accurately, hence providing a capacitor unit.

In the conventional capacitor 5003, if the negative electrode of the capacitor element 220 is connected to the sealing plate 222, the sealing plate 222 becomes the negative terminal. When the capacitor 5003 is used under a high temperature and a high humidity with the sealing plate 222 being the negative terminal, the electrolyte may enter into the interface between the sealing plate 222 and a rubber material of the pressure control valve 227, thus hence leaking to outside.

Since the sealing plate 223 is the negative terminal, aluminum composing the sealing plate 222 causes the following electro-chemical reaction with water in the electrolyte near the rubber material of the pressure control valve 227, thus producing hydroxide ion.

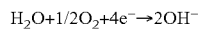

The hydroxide ion and positive ion in the electrolyte causes the electrolyte to exhibit a strong alkaline property. The electrolyte exhibiting the alkaline property may enter into the interface between the sealing plate 222 and the rubber material and contact the whole surface of the rubber material of the pressure control valve 227. The entering electrolyte may cut a chemical bridge structure of the rubber material and have the quality of the rubber material deteriorate, accordingly preventing the rubber material from having a sealing effect and allowing the electrolyte to leak out.

If a slight gap is provided at the interface between the sealing plate 222 and the rubber material, the electrolyte exhibiting the alkaline property alkali may enter the gap due to the surface tension of the electrolyte and then, may leak. In order to prevent the leaking, the sealing plate 222 is attached securely to the rubber material.

In the case that the positive electrode of the capacitor element 220 is joined to the sealing plate 222 to thus be the positive terminal and that the electrolyte contains tetra-ethyl-ammonium-fluoroborate as solute of the electrolyte, the negative ion in the electrolyte, that is, tetra-fluoroborate anion causes the following electro-chemical reaction near the sealed opening of the metal case 221.

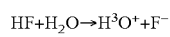

The above reaction produces hydronium ion in the electrolyte, accordingly causing the electrolyte to exhibit a strong acidic property near the sealing plate 222. The electrolyte exhibiting the acidic property may enter into the interface between the sealing plate 222 and the rubber material of the pressure control valve 227 and contact the sealing plate 222 and the whole surface of the rubber material, thereby causing the surface of the sealing plate 222 and the rubber material to deteriorate and causing its sealing effect to decline.

FIG. 33 is a cross sectional view of a still further conventional capacitor 5004 disclosed in Japanese Patent Laid-Open Publication No. 2000-315632. A capacitor element 310 includes collectors made of aluminum foil and a pair of positive and negative electrodes having polarized layers provided on the collectors, respectively. The electrodes deviate from each other in opposite directions and rolled with a separator provided between the electrodes, thus providing the capacitor element 310. A positive electrode and a negative electrode are connected with end surfaces 310A and 310B of the capacitor element 310, respectively.

A metal plate 311 is joined to the end surface 310A of the capacitor element 310. The capacitor element 310 is accommodated together with an electrolyte in a cylindrical metal case 312 which is made of aluminum and has a bottom 312D thereof. A projection 312A is provided on the bottom 312D of the metal case 312. The metal case 312 has a diameter reduced annularly near an opening 312E, thereby providing a narrowed portion 312B. A sealing plate 313 made of insulating material seals the opening 312B of the metal case 312. A core 314 having a bar shape has a terminal 314A at an end thereof for external connection. A terminal 315 for external connection is joined to an outer surface of the metal case 312. The core 314 and the metal case 312 are electrically insulated from each other with an insulator 316. A plug 317 made of elastic, insulating material, such as rubber, is provided in combination with a cap 318 to form a pressure control valve. The capacitor 5004 further includes an O-ring 319 and a sealing rubber 320. The sealing rubber 320 is provided on a periphery of an upper surface of the sealing plate 313. The metal case 312 has a portion 312C curled at the opening 312E thereof. The sealing rubber 320 is compressed with the curled portion 312C, thereby sealing between the metal case 312 and the sealing plate 313.

The electrode, the end surface 310B, of the capacitor element 310 is electrically connected to the bottom 312D of the metal case 312. The end surface 310A of the capacitor element 310 is joined to the metal plate 311. A core 314 having a bar shape is provided at the center of the capacitor element 310 and joined to the metal plate 311. The sealing plate 313 has a through-hole 313A through which the terminal 314A extends. The opening 312E of the metal case 312 is sealed with the sealing plate 313. The metal case 313 functions as a collector terminal.

FIG. 34 illustrates plural capacitors 5004 connected to each other. The terminals 31A and 315 of the capacitors 5002 having planer shapes deviate in directions 5004B and 5004C opposite to each other with respect to a center axis 5004A of the metal case 312. This arrangement of the capacitors 5004 allows the terminals 31A and 315 joined onto each other at the center axis 5004A of the metal case 312. Even if the capacitors 5004 are mounted onto an upper surface of a board 321, any one of the capacitors 5004 does not apart from the board 321, and thus, the capacitors 5004 are connected to each other accurately.

The conventional capacitor 5004 however can hardly have a small size, a large capacitance, a small resistance, or a low cost. The metal plate 311 and the core 314 connected with the electrode at the end surface 310A of the capacitor element 310 extend across the sealing plate 313, thus providing a large electrical resistance and being prevented from having a small size and a low cost.

SUMMARY OF THE INVENTION

A capacitor includes a metal case having an opening, a capacitor element accommodated in the metal case, an electrolyte accommodated in the metal case, and a sealing rubber sealing the opening of the metal case. The sealing rubber seals the opening of the metal case while the sealing rubber is compressed to have a stress applied thereto. The stress is not lower than 0.5 MPa and not higher than a predetermined maximum value.

This capacitor prevents the electrolyte from leaking, thus having high reliability.

BRIEF DESCRIPTION OF THE DRAWINGS

FIG. 3 illustrates a result of an air tightness test in a metal case and a stress applied to a sealing rubber of the capacitor according to Embodiment 1.

FIG. 28 is a cross sectional view of a conventional capacitor.

FIG. 29 is a cross sectional view of another conventional capacitor.

FIG. 30 illustrates the capacitors each shown in FIG. 29 connected to each other.

FIG. 31 is a cross sectional view of a further conventional capacitor.

FIG. 32 illustrates the capacitors each shown in FIG. 31 connected to each other.

FIG. 33 is a cross sectional view of a still further conventional capacitor.

FIG. 34 illustrates the capacitors each shown in FIG. 33 connected to each other.

REFERENCE NUMERALS

1 Capacitor Element
1D Electrolyte
2 Metal Case
2B Narrowed portion
2G Opening
1502C Bottom
3 Terminal Plate
4 Insulating Ring
5 Sealing Rubber
6 Capacitor Element
7A Positive Lead Terminal Electrode
7B Negative Lead Terminal Electrode
8 Sealing Rubber
8A Aperture (First Aperture)
8B Aperture (Second Aperture)
9 Metal Case
9A Narrowed portion
502A Collector (SecondCollector)
502B Collector (FirstCollector)
502C Electrode (First Electrode)
502D Electrode (Second Electrode)
503A Polarized Layer (Second Polarized Layer)
503B Polarized Layer (First Polarized Layer)
504A Separator (Second Separator)
504B Separator (First Separator)
101 Capacitor Element
102 Metal Case
102B Narrowed portion
102C Curled Portion
103 Terminal Plate
103B Bump
103F Step Surface
103G (Second) Outer Edge Surface
103H (First) Outer Edge Surface
104 Sealing Rubber
105 Insulator
1105 Insulator
1105A Resin Film
1105B Rubber Layer
106 Insulating Ring
107 Sealing Rubber
108 Sealing Rubber
201 Capacitor Element
202 Metal Case
202A Narrowed portion
202C Curled Portion
203 Terminal Plate
204 Sealing Rubber
205 (First) Insulator
206 (First, Second) Insulator
1206 Insulator
1206A Resin Film
1206B Rubber Layer
207 Terminal Plate
208 Insulating Ring
209 Sealing Rubber
210 Insulator
211 Insulator
212 Insulator
213 Insulator
214 Insulator
215 Insulator
301 Capacitor Element
302 Metal Case
302B Narrowed portion
302C Curled Portion
303 Terminal Plate
304 Sealing Rubber
305A Sealing Rubber
305B Sealing Rubber
306 Sealing Rubber
307 Terminal Plate
308 Sealing Rubber
1103 Terminal Plate
1103F Step Surface
1103G (Second) Outer Edge Surface
1103H (First) Outer Edge Surface.

DETAIL DESCRIPTION OF THE PREFERRED EMBODIMENTS

Exemplary Embodiment 1

Figure 1A:
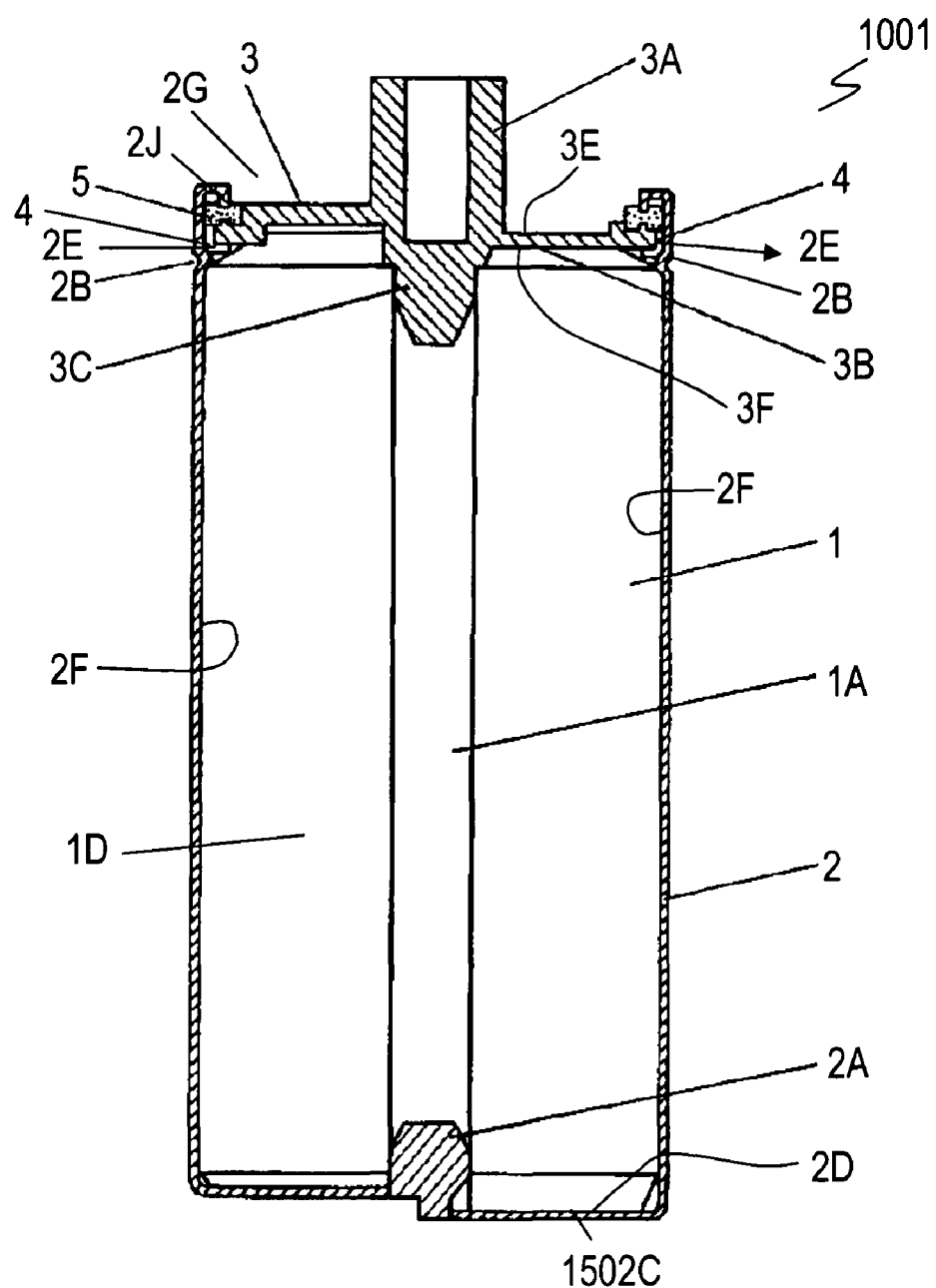
FIG. 1A is a cross sectional view of a capacitor according to Exemplary Embodiment 1 of the present invention.
Figure 1B:
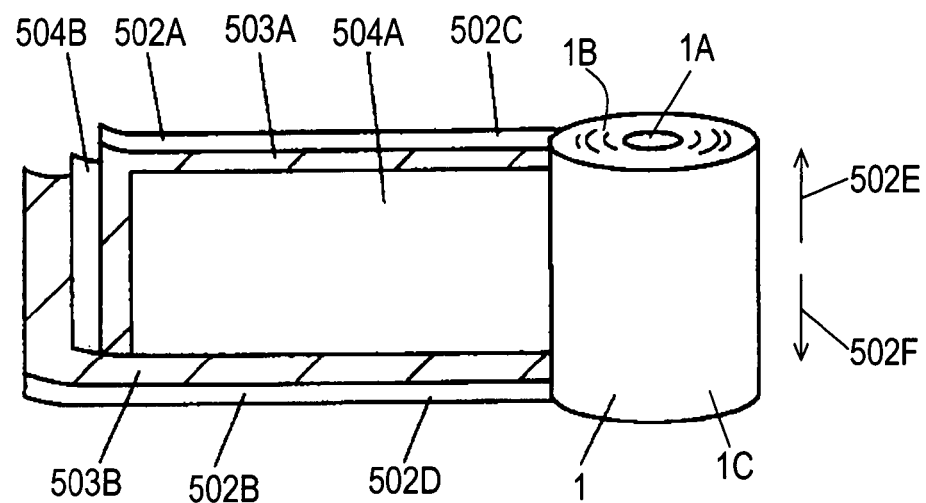
FIG. 1B is an exploded perspective view of a capacitor element of the capacitor according to Embodiment 1.
Figure 1C:
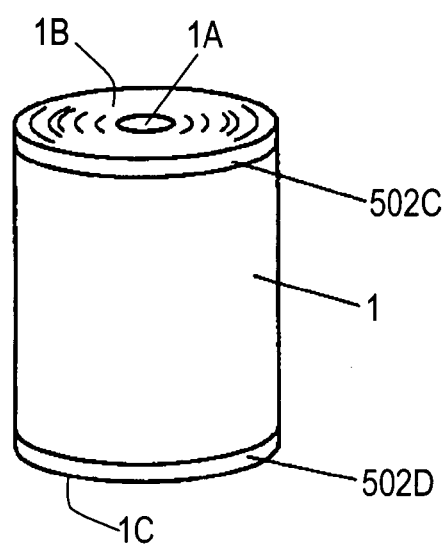
FIG. 1C is a perspective view of the capacitor element according to Embodiment 1.
Figure 2A:
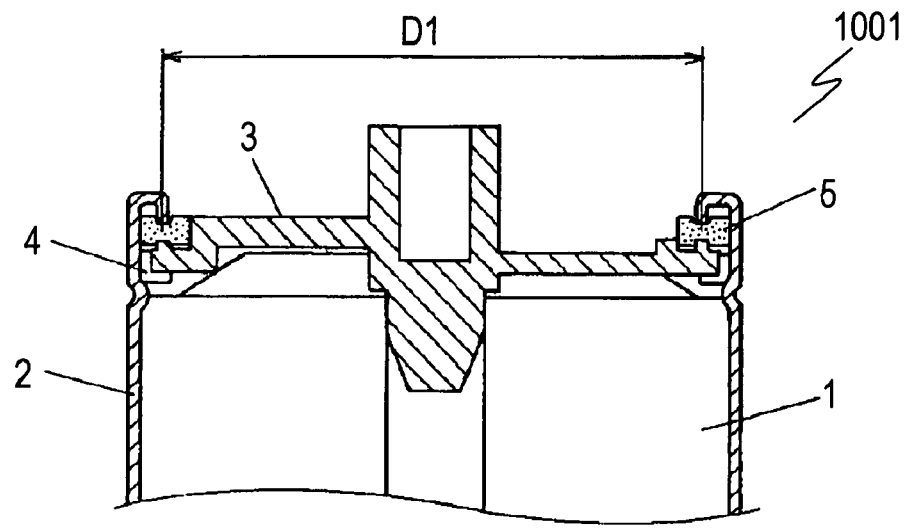
FIG. 2A is a cross sectional view of an essential part of the capacitor according to Embodiment 1.
Figure 2B:
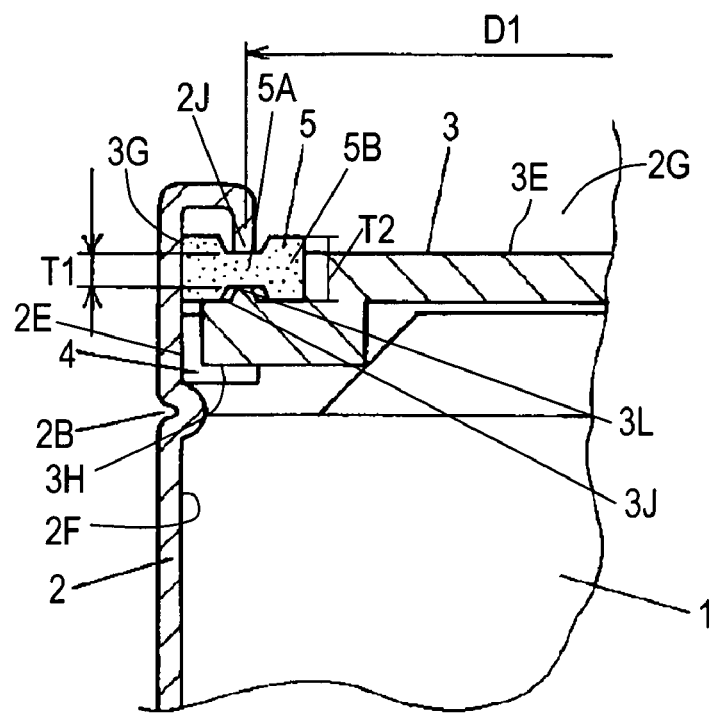
FIG. 2B is a cross sectional view of an essential part of the capacitor according to Embodiment 1.

FIG. 1A is a cross sectional view of a capacitor 1001 according to Exemplary Embodiment 1 of the present invention. FIG. 1B is an exploded perspective view of a capacitor element 1 of the capacitor 1001. FIG. 1C is a perspective view of the capacitor element 1. FIGS. 2A and 2B are cross sectional views of essential parts of the capacitor 1001.

The capacitor element 1 includes a collector 502B made of aluminum foil, a polarized layer 503B provided on the collector 502B, an insulating separator 504B provided on the polarized layer 503B, a collector 502A made of aluminum foil, a polarized layer 503A provided on the collector 502A, and an insulating separator 504A provided on the polarized layer 503A. The polarized layer 503B is made of mixture of activated carbon, binder, and conductive material. The collectors 502A and 502B, the polarized layers 503A and 503B, and the separators 504A and 504B are rolled to form the capacitor element 1 having a hollow 1A provided in the center thereof. The collectors 502A and 502B deviate from each other in opposite directions 502E and 502F, respectively, and have portions 502C and 502D exposing from end surfaces 1B and 1C of the capacitor element 1 in directions 502E and 502F, respectively. The exposing portions 502C and 502D of the collectors 502A and 502B function as two electrodes of the capacitor element 1, a positive electrode 502C and a negative electrode 502D, respectively.

The capacitor element 2 is accommodated together with an electrolyte 1D in a metal case 2 which has a cylindrical shape and has a bottom 1502C thereof. A projection 2A is provided unitarily with an inner surface 2D of the bottom 1502 of the metal case 2 to fit into the hollow 1A of the capacitor element 1. The end surface 1C of the capacitor element 1 is joined mechanically and electrically to the inner surface 2D of the bottom 1502C of the metal case 2 by a joining method, such as laser welding. The metal case 2 has a narrowed portion 2B at which a diameter of the metal case 2 is reduced locally. The narrowed portion has a cross section having a V-shape for holding an edge of the end surface 1B of the capacitor element 1 from outside.

A terminal plate 3 made of aluminum has an outer surface 3E exposing to the outside of the metal case 2 and has an inner surface 3F facing an inside of the metal case 2. The terminal plate 3 includes a positive terminal 3A provided unitarily with the outer surface 3E for external connection, a joint portion 3B provided at the inner surface 3F, and a projection 3C provided unitarily with the inner surface 3F. The projection 3C is engaged into the hollow 1A of the capacitor element 1. The end surface 1B of the capacitor element 1 is joined mechanically and electrically to the joint portion 3B by a joining method, such as laser welding.

An insulating ring 4 having a ring shape is provided on an upper end 2E of the narrowed portion 2B of the metal case 2. The insulating ring 4 extends from between the inner surface 2F of the metal case 2 and the outer edge 3G of the terminal plate 3 to a portion of an inner rim 3H of terminal plate 3, for electrically insulating between the terminal plate 3 and the metal case 2.

A sealing rubber 5 having a ring shape made of insulating rubber material is provided on the outer rim 3J of the upper surface 3E of the terminal plate 3. The upper end 2J at the opening 2G of the metal case 2 is curled inward with the sealing rubber 5 (by a curling process), thereby allowing the sealing rubber 5 and the terminal plate 3 having a circular shape to seal the opening 2G while the sealing rubber 5 is compressed. The opening 2G of the metal case 2 has a diameter D1. A portion 5A of the sealing rubber 5 which is compressed with the metal case 2 has a thickness T1 while a portion 5B of the sealing rubber 5 which is not compressed has a thickness T2. The terminal plate 3 has a projection 3L extending from a rim 3J of the outer surface 3E. The sealing rubber 5 is compressed between the end 2J of the metal case 2 and the projection 3L of the terminal plate 3.

The sealing rubber 5 may be made of peroxide vulcanized rubber, such as ethylene propylene rubber or butyl rubber (isobutylene isoprene rubber). FIG. 3 illustrates a result of an air-tightness test of the metal case 2 and stresses which is applied to the sealing rubber 5 during the curling process with the metal case 2.

In the capacitor 1001 according to Embodiment 1, air tightness is necessarily maintained even if the pressure in the metal case 2 rises to a predetermined value. The air tightness test was executed for samples of the capacitor 1001 including the sealing rubber 5 made of ethylene propylene rubber (EPT) and got samples of the capacitor 1001 including the sealing rubber 5 made of isobutylene isoprene rubber (IIR) while the pressure in the metal case 2 is held at the predetermined value.

As shown in FIG. 3, samples having the maximum value of the stress applied to the sealing rubber 5 lower than 0.47 MPa did not maintain the air tightness (denoted by the evaluation result "A" shown in FIG. 3). Thus, In order to maintain the air tightness in the metal case 2, a stress not lower than 0.47 MPa or preferably not lower than 0.5 MPa in view of safety is necessarily applied to the sealing rubber 5. Ethylene propylene rubber has Young's modulus of 200N/cm$^2$ and the breaking elongation rate of 150%. Isobutylene isoprene rubber has Young's modules of 900N/cm$^2$ and the breaking elongation rate of 200%. Although ethylene propylene rubber and isobutylene isoprene rubber are different from each other in physical values, such as Young's modulus and the breaking elongation rate, the stress applied to the sealing rubber 5 for maintaining the air tightness is not lower than 0.5 MPa.

Since ethylene propylene rubber and isobutylene isoprene rubber are different from each other in the physical values, these materials have compression rates different from each other for applying the stress not lower 0.5 MPa to the sealing rubbers 5. Even when the physical values are different between production lots of one material, the stress applied to the sealing rubber 5 during the sealing of the metal case 2 in processes for manufacturing the capacitor 1001 can be controlled as described above to maintain the air tightness (denoted by the evaluation result "B" in FIG. 3).

When an excessively large stress is applied to the sealing rubber 5, a portion of the rubber 5 reaches the breaking elongation rate preventing the stress from being a necessary value, accordingly failing to maintain the air tightness (denoted by the evaluation result "C" in FIG. 3). When the stress of 1.05 MPa is applied to the sealing rubber 5 made of ethylene propylene rubber, the rubber 5 has the elongation rate of 152%, which is larger than the breaking elongation rate of 150% of ethylene propylene rubber, hence failing to maintain the air tightness. When the stress of 9.44 MPa is applied to the stress sealing rubber 5 made of isobutylene isoprene rubber, the rubber 5 has the elongation rate of 205%, which is larger than the elongation rate of 200% of isobutylene isoprene rubber, hence failing to maintain the air tightness.

The predetermined maximum value Ymax of the stress is determined according to the physical properties of the material of the sealing rubber 5. The air tightness test was performed for samples of the sealing rubber 5 made of ethylene propylene rubber and for samples of the sealing rubber 5 made of isobutylene isoprene rubber. These samples are identical in their shapes but different in the physical properties. According to the test, it was confirmed that the air tightness was maintained when the stress applied to the sealing rubber 5 having the breaking elongation rate of R (%) and Young's modulus of F (N/cm$^2$) was no higher than the predetermined maximum value Ymax shown below.

$$Ymax = (R-100) \times 0.0001 \times F$$

Even if the physical properties are different from one production lot to another, the sealing rubber 5 made of one material can maintain the air tightness by controlling the stress such that the stress is not lower than 5 MPa and not higher than the maximum value Ymax.

As described above, the stress applied to the sealing rubber 5 during the sealing of the metal case is controlled to be within the predetermined range to increase its sealing effect, thus providing the capacitor 1001 having reliability preventing the electrolyte 1D from leaking.

Alternatively, based on the stress determined in the above way, a range of dimensions of the sealing rubber 5 to be compressed may be predetermined according to Young's modulus and the breaking elongation rate of the sealing rubber 5. The dimensions of the sealing rubber is controlled to be within the predetermined range so as to apply a necessary stress to the sealing rubber 5, thus allowing the capacitor 1001 having high reliability preventing the electrolyte 1D from leaking to be manufactured stably.

Exemplary Embodiment 2

Figure 4:
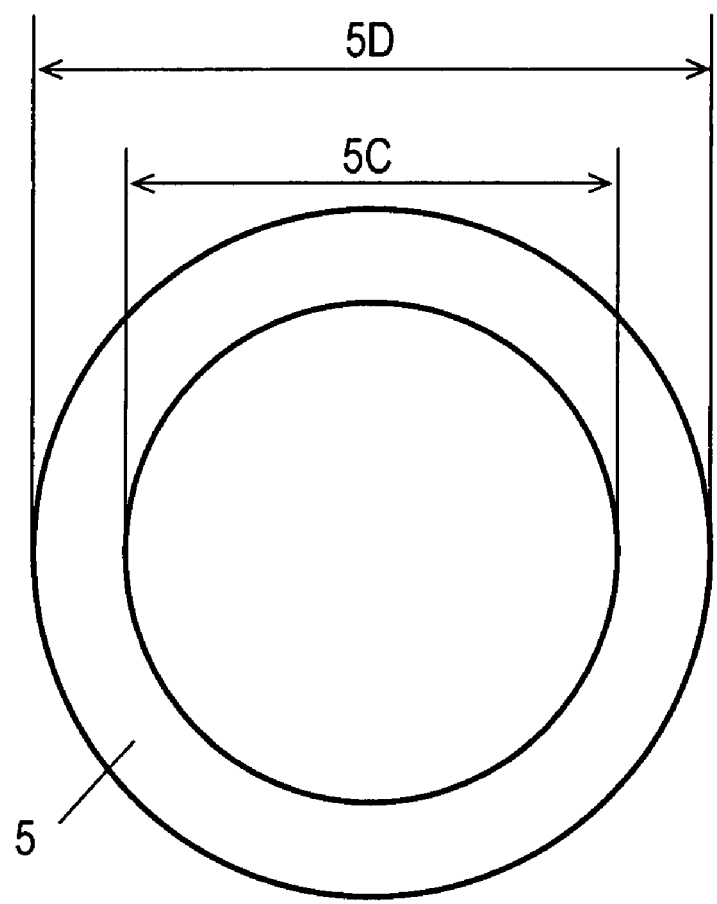
FIG. 4 is a top view of a sealing rubber of a capacitor according to Exemplary Embodiment 2 of the invention.
Figure 5A:
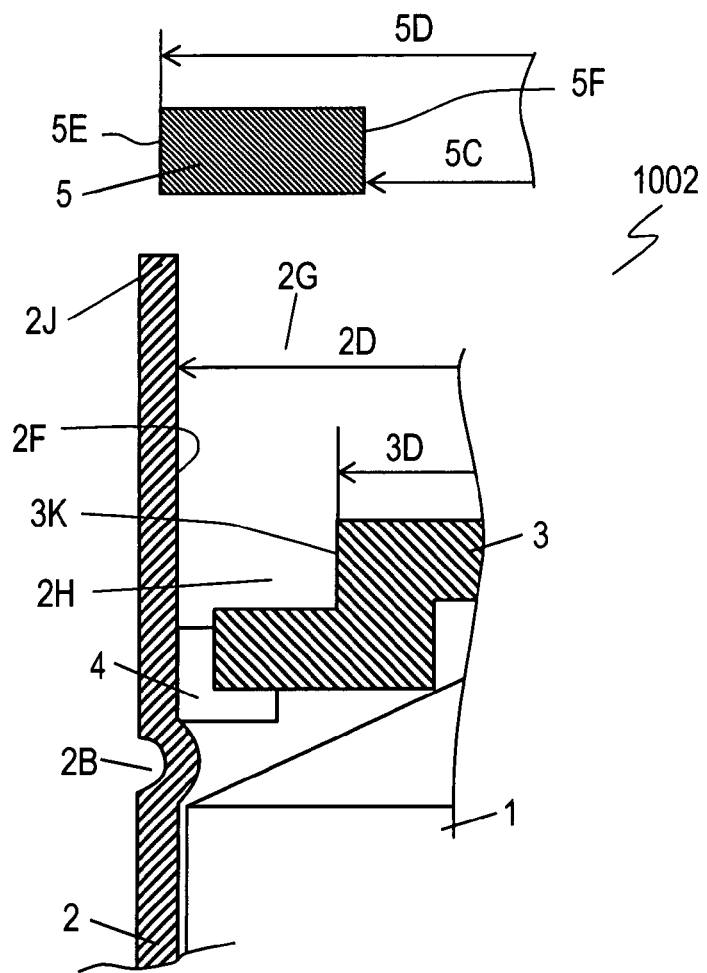
FIG. 5A is a cross sectional view of an essential part of the capacitor according to Embodiment 2.
Figure 5B:
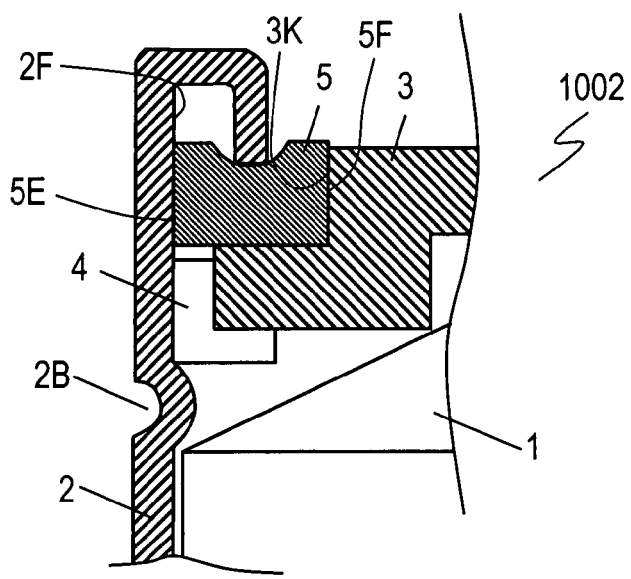
FIG. 5B is a cross sectional view of an essential part of the capacitor shown in FIG. 5A.

FIG. 4 is a top view of a sealing rubber 5 of a capacitor 1002 according to Exemplary Embodiment 2 of the present invention. FIG. 5A is a cross sectional view of an essential part of the capacitor 1002 before a metal case 2 is subjected to the curling process, i.e., before the metal case 2 is sealed. FIG. 5B is a cross sectional view of the essential part of the capacitor 1002 after the metal case 2 is sealed. The same components as those of the capacitor 1001 according to Embodiment 1 shown in FIGS. 1A to 2B are denoted by the same reference numerals, and their description will be omitted.

The sealing rubber 5 having a ring shape has an inner diameter 5C and an outer diameter 5D. The sealing rubber 5 may be made of peroxide vulcanized rubber or resin vulcanized rubber while the rubber 5 according to Embodiment 1 is made from butyl rubber (isobutylene isoprene rubber).

As shown in FIG. 5A, the metal case 2 has an inner diameter 2D. An outer edge surface 3K of the terminal plate 3 contacting the sealing rubber 5 has an outer diameter 3D.

As shown in FIG. 5B, the inner diameter 5C of the sealing rubber 5 is smaller than the outer diameter 3D of the terminal plate 3, and/or the outer diameter 5D of the sealing rubber 5 is greater than the inner diameter 2D of the metal case 2. The sealing rubber 5 is inserted with pressure into a space 2H between the inner surface 2F of the metal case 2 and the outer edge surface 3K of the terminal plate 3, and then, an end 2J of the opening 2G of the metal case 2 is curled inward (by the curling process) for sealing the opening 2G.

At this moment, the portion of the sealing rubber 5 compressed by the maximum compression rate is the outer surface 5E contacting the inner surface 2F of the metal case 2, and is the inner surface 5F contacting the outer edge surface 3K of the terminal plate 3. The outer diameter 5D and the inner diameter 5C of the sealing rubber 5 is determined, so that the stress produced at and around the outer surface 5E and the inner surface 5F of the sealing rubber 5 is not lower than 0.5 MPa and not higher than the maximum Ymax which is determined by Young's modulus and the breaking elongation rate of the material of the sealing rubber 5. This provides the sealing rubber 5 with high air tightness between the metal case 2 and the terminal plate 3, thus providing the capacitor 1002 with high reliability preventing the electrolyte 1D from leaking.

Figure 6A:
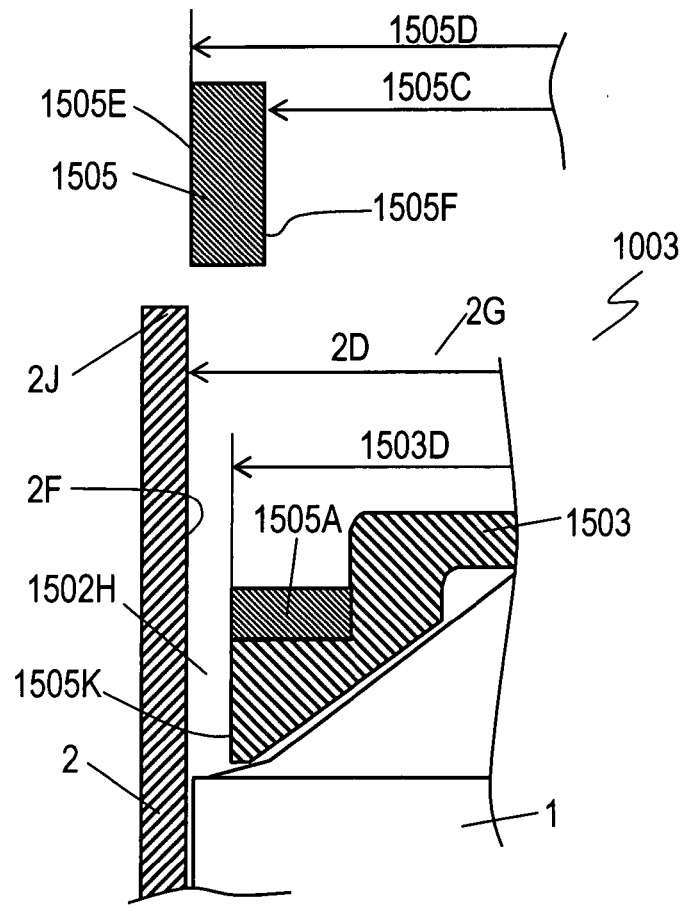
FIG. 6A is a cross sectional view of an essential part of another capacitor according to Embodiment 2.
Figure 6B:
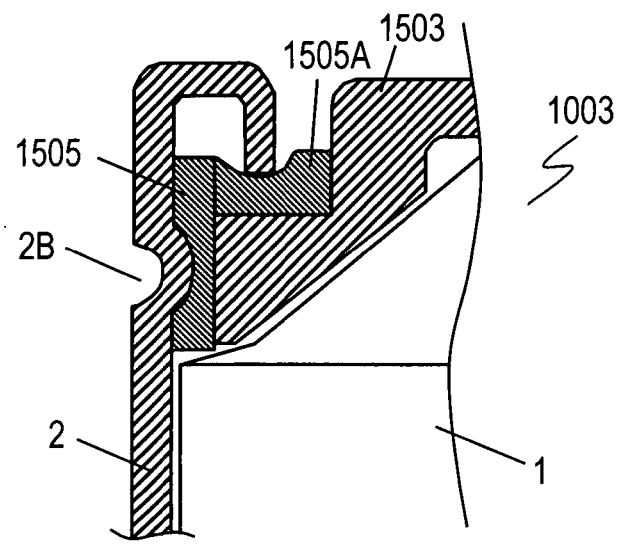
FIG. 6B is a cross sectional view of an essential part of the capacitor shown in FIG. 6A.

FIGS. 6A and 6B are cross sectional views of an essential part of another capacitor 1003 according to Embodiment 2. The same components as those of the capacitor 1002 shown in FIGS. 5A and 5B are denoted by the same reference numerals, and their description will be omitted. The capacitor 1003 includes a terminal plate 1503 and a sealing rubber 1505 having a ring shape instead of the terminal plate 3 and the sealing rubber 5 of the capacitor 1001 according to Embodiment 1, and does not include the insulating ring 4 of the capacitor 1001. The sealing rubber 1505 and the terminal plate 1503 of the capacitor 1003 are made of materials identical to those of the sealing rubber 5 and the terminal plate 3 of the capacitor 1001, respectively. The capacitor 1003 further includes a cushion member 1505A for cushioning the curling of the end 2J of the metal case 2 at the opening 2G. The inner diameter 1505C of the sealing rubber 1505 is smaller than the outer diameter 1503D of the terminal plate 1503 while the outer diameter 1505D of the sealing rubber 1505 is greater than the inner diameter 2D of the metal case 2. As shown in FIG. 6B, when the sealing rubber 1505 is inserted under pressure into a space 1502H between the inner surface 2F of the metal case 2 and the outer edge surface 1503K of the terminal plate 1503, the end 2J of the metal case 2 at the opening 2G is inward curled (by the curling process) for sealing the opening.

At this moment, the portion of the sealing rubber 5 compressed by the maximum compression rate is the outer surface 1505E contacting the inner surface 2F of the metal case 2, and is the inner surface 1505F contacting the outer edge surface 1503K of the terminal plate 1503. The outer diameter 1505D and the inner diameter 1505C of the sealing rubber 1505 is determined, so that the stress produced at and around the outer surface 1505E and the inner surface 1505F of the sealing rubber 5 is not lower than 0.5 MPa and not higher than the maximum Ymax which is determined by Young's modulus and the breaking elongation rate of the material of the sealing rubber 1505. This provides the sealing rubber 1505 with high air tightness between the metal case 2 and the terminal plate 1503, thus providing the capacitor 1003 with high reliability preventing the electrolyte 1D from leaking.

Exemplary Embodiment 3

Figure 7:
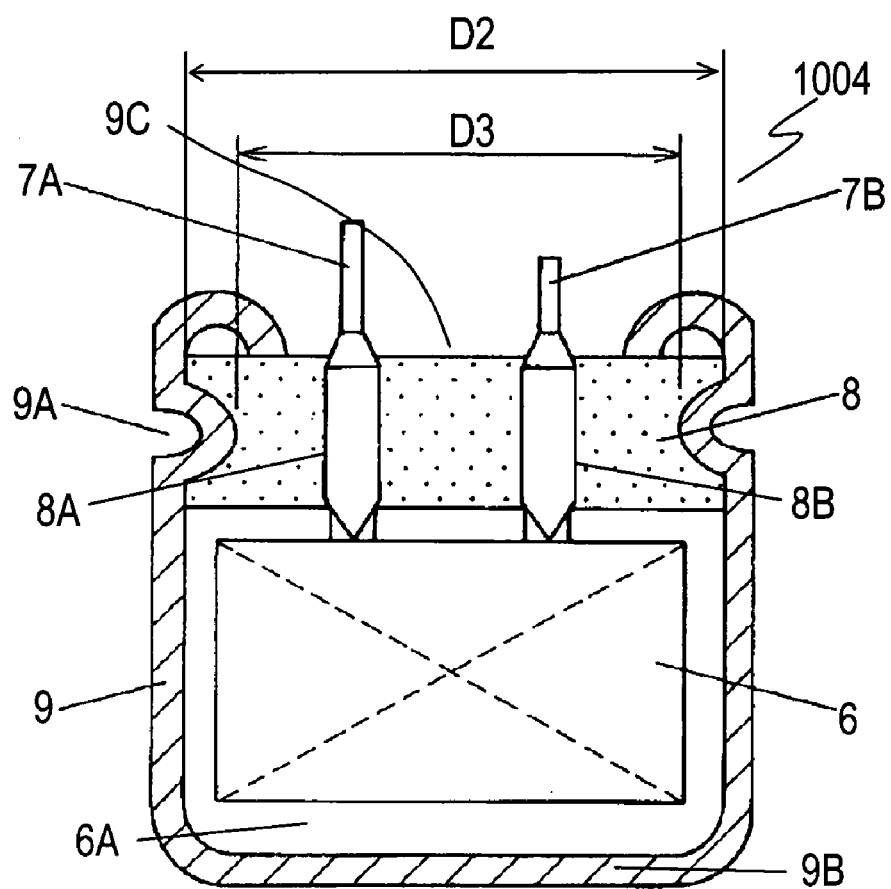
FIG. 7 is a cross sectional view of a capacitor according to Exemplary Embodiment 3 of the invention.

FIG. 7 is a cross sectional view of a capacitor 1004 according to Exemplary Embodiment 3 of the present invention. A positive lead terminal electrode 7A and a negative lead terminal electrode 7B extend from a capacitor element 6. The capacitor element 6 is accommodated together with an electrolyte 6A in a metal case 9 having a bottom 9B and a sealing rubber 8. The metal case 9 has a narrowed portion 9A at which a diameter of the metal case 9 is reduced locally. The metal case 9 has a diameter D2 at an opening 9C and a diameter D3 at the narrowed portion 9A. The sealing rubber 8 has throughholes 8A and 8B provided therein through which the positive lead terminal electrode 7A and the negative lead terminal electrode 7B are inserted, respectively.

The resultant measurements of the air tightness test shown in FIG. 3 can be applied to the capacitor 1004, similarly to the capacitor 1001 according to Embodiment 1 The sealing rubber 8 is compressed at the narrowed portion 9A, thus producing the stress. The diameter D3 is determined so that the stress is not lower than 0.5 MPa and not higher than the predetermined maximum Ymax. The maximum Ymax (MPa) of the stress applied to the sealing rubber 8 made of material having the breaking elongation rate of R (%) and Young's modulus of F (N/cm$^2$) is, similarly to the capacitor according to Embodiment 1, determined by the flowing formula.

$$Y\max=(R-100)\times0.001\times F$$

As described above, the stress applied to the sealing rubber 8 during the sealing of the metal case 9 is controlled to be within the predetermined range to increase its sealing effect, thus providing the capacitor 1004 with reliability preventing the electrolyte 1D from leaking.

Alternatively, based on the stress determined in the above way, a range of dimensions of the sealing rubber 8 to be compressed may be predetermined according to Young's modulus and the breaking elongation rate of the sealing rubber 8. The dimensions of the sealing rubber is controlled to be within the predetermined range so as to apply a necessary stress to the sealing rubber 8, thus allowing the capacitor 1004 having high reliability preventing the electrolyte 1D from leaking to be manufactured stably.

Exemplary Embodiment 4

Figure 8A:
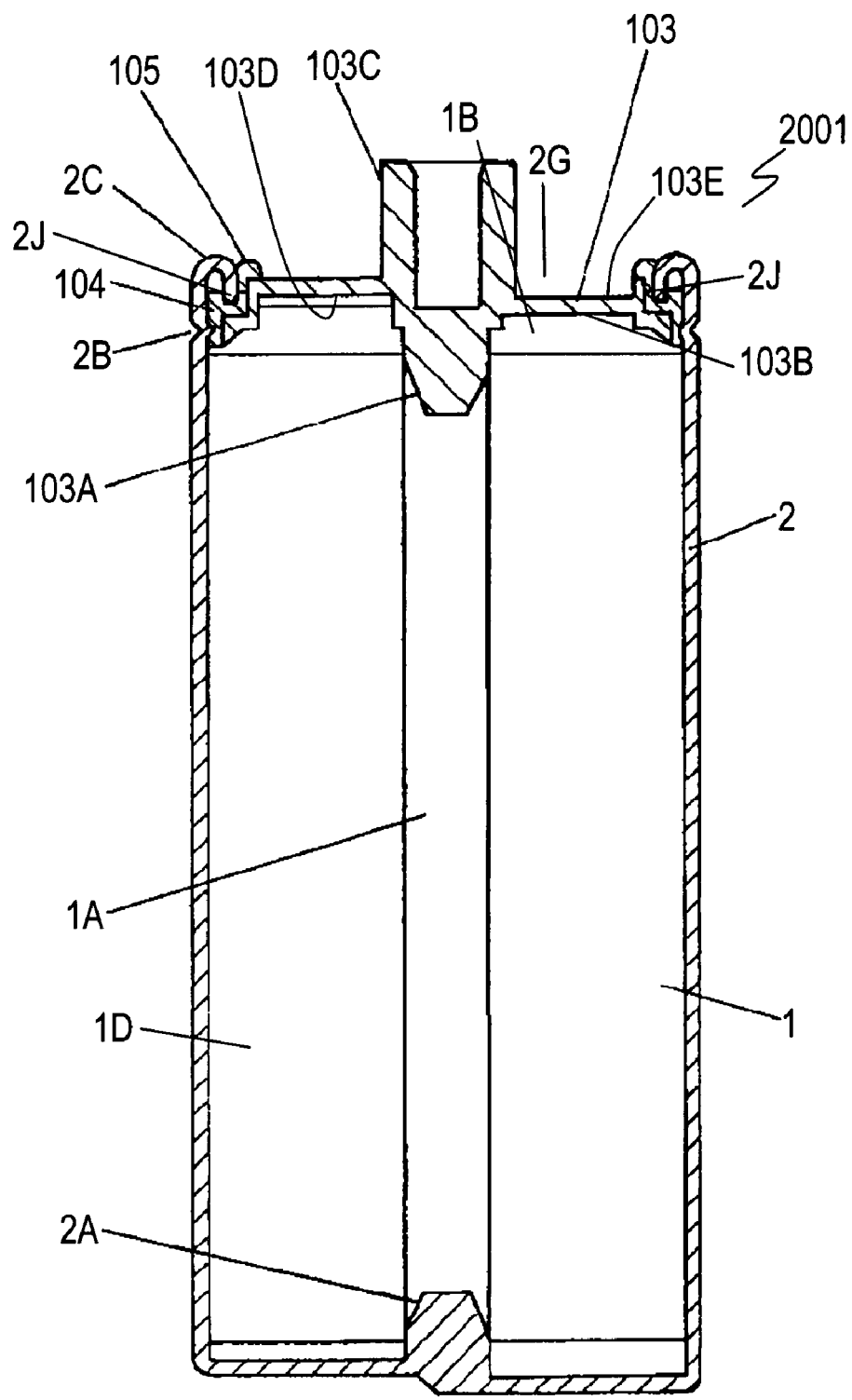
FIG. 8A is a cross sectional view of a capacitor according to Exemplary Embodiment 4 of the invention.
Figure 9:
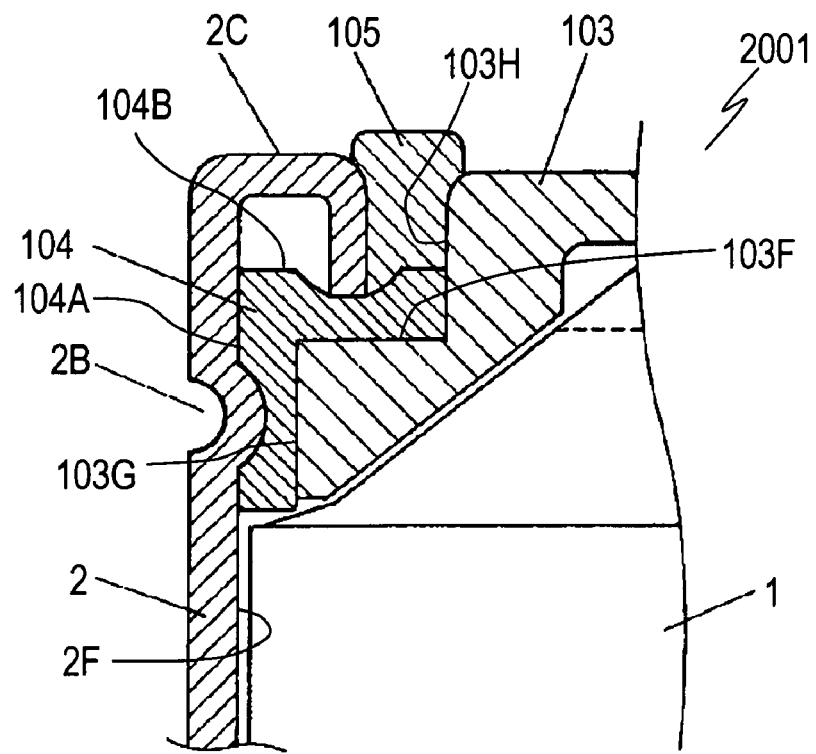
FIG. 9 is a cross sectional view of an essential part of the capacitor according to Embodiment 4.

FIG. 8A is a cross sectional view of a capacitor 2001 according to Exemplary Embodiment 4 of the present invention. FIG. 9 is a cross sectional view of an essential part of the capacitor 2001. The same components as those of the capacitor 1001 according to Embodiment 1 shown in FIGS. 1A to 2B are denoted by the same reference numerals, and their description will be omitted. The capacitor 2001, similarly to the capacitor 1001 according to Embodiment 1, includes a capacitor element 1, an electrolyte 1D, and a metal case 2 having a cylindrical shape made of aluminum. The capacitor element 1 and the electrolyte 1D are accommodated in the metal case 2. The capacitor 2001 further includes a terminal plate 103, a sealing rubber 104, and an insulator 105.

The terminal plate 103 made of aluminum has an outer edge surface 103H and an outer edge surface 103G provided at the upper part and the lower part of an outer edge surface of the terminal plate, respectively. The diameter at the outer edge surface 103H is smaller than that at the outer edge surface 103G. A step surface 103F having an annular shape is provided between the outer edge surfaces 103H and 103G of the terminal plate 103. The outer edge surface 103H of the terminal plate 103 faces the metal case 2. The outer edge surface 103G faces the metal case 2, and is closer to the metal case 2 than the outer edge surface 103H is. The step surface 103F is located between the outer edge surfaces 103G and 103H, and is connected to the outer edge surfaces 103G and 103H.

Figure 8B:
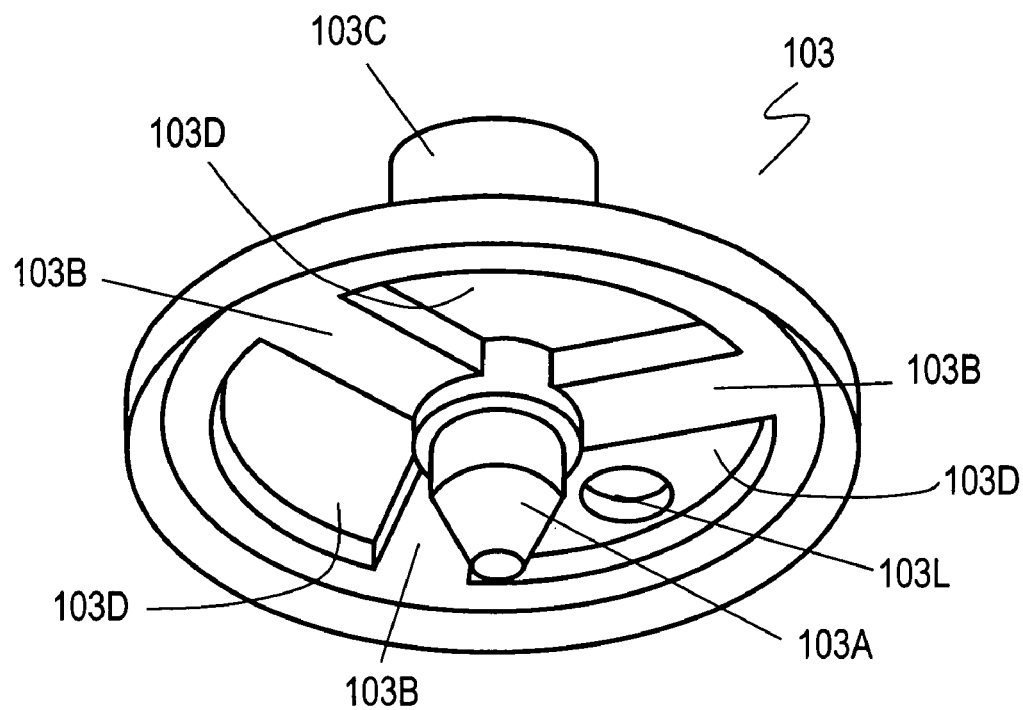
FIG. 8B is a perspective view of a terminal plate of the capacitor according to Embodiment 4.

FIG. 8B is a perspective view of the terminal plate 103 of the capacitor 2001. As shown in FIGS. 8A and 8B, a projection 103A projects from the inner surface 103D of the terminal plate 103. Bumps 103E project from the inner surface 103D. A threaded portion 103C for external connection is provided on the outer surface 103E of the terminal plate 103. While the projection 103A is engaged into the hollow 1A provided in the capacitor element 1, the bumps 103B of the terminal plate 103 is joined mechanically and electrically to an end surface 1B of the capacitor element 1 by a joining method, such as laser welding. The terminal plate 103 further has an aperture 103L provided therein for feeding the electrolyte 1D.

The sealing rubber 104 having a ring shape has a cross section having an inverted L-shape to contact the step surface 103F and the outer edge surface 103G of the terminal plate 103. The outer surface 104A of the sealing rubber 104 contacts the inner surface 2F of the metal case 2. The outer surface 104A of the sealing rubber 104 is compressed with a narrowed portion 2B of the metal case 2. An end 2J of the metal case 2 at the opening 2G is bent inward to form a curled portion 2C. An upper surface 104B of the sealing rubber 104 is compressed with the curled portion 2C, and seals between the metal case 2 and the terminal plate 103 and insulates the metal case 2 from the terminal plate 103.

The insulator 105 covers a portion of the sealing rubber 104 exposing from between the curled portion 2C of the metal case 2 and the terminal plate 3. The insulator 105 is made of mixture of one selected from butyl rubber (IIR), ethylene propylene rubber (EPT), and styrene butadiene rubber (SBR), and one selected from cycloaliphatic petroleum resin, aliphatic petroleum resin, and terpene resin. The insulator 105 is seated between the outer edge surface 103H of the terminal plate 103 and the curled portion 2C of the metal case 2, so that no recess is produced between the terminal plate 103 and the metal case 2. The insulator 105 is formed by applying material containing organic solvent and rubber, such as IIR rubber, dispersed therein, and then, drying the material to evaporate the organic solvent.

In the capacitor 2001 according to Embodiment 4, the insulator 105 covers the portion of the sealing rubber 104 exposing from between the metal case 2 and the terminal plate 103. The insulator 105 prevents a short-circuit between the metal case 2 and the terminal plate 103 under a hostile atmosphere where drops of moisture are generated, for example, during a humidity-resistance test, thus providing the capacitor 2001 with high humidity resistance.

Figure 10:
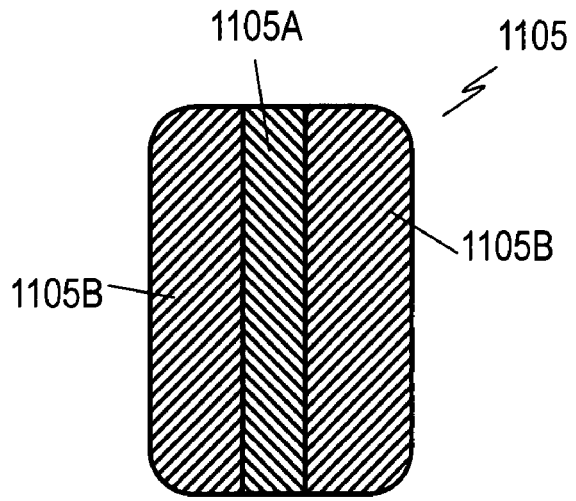
FIG. 10 is a cross sectional view of an insulator of the capacitor according to Embodiment 4.

According to Embodiment 4, the insulator 105 is made of mixture of one selected from rubber selected from butyl rubber (IIR), ethylene propylene rubber (EPT), and styrene butadiene rubber (SBR), and one selected from cycloaliphatic petroleum resin, aliphatic petroleum resin, and terpene resin. FIG. 10 is a cross sectional view of another insulator 1105 according to Embodiment 4. The insulator 1105 includes a resin film 1105A and rubber layers 1105B provided on both surfaces of the resin film 1105A. The resin film 1105A may be made of one selected from polyethylene (PE), polyethylene terephthalate (PET), polypropylene (PP), polyphenylene sulfide (PPS), tetra-fluoro-ethylene perfluoro-alkyl-vinyl-ether copolymer (PFA), ethylene fluoride propylene copolymer (FFP), polyvinylidene fluoride (PVDF), ethylene tetra-fluoro-ethylene copolymer (ETFE), and poly-tetra-fluoro-ethylene (PTFE). The rubber layer 1105B may be made of mixture of one selected from butyl rubber (IIR), ethylene propylene rubber (EPT), and styrene butadiene rubber (SBR) and one selected from cycloaliphatic petroleum resin, aliphatic petroleum resin, and terpene resin.

Figure 11:
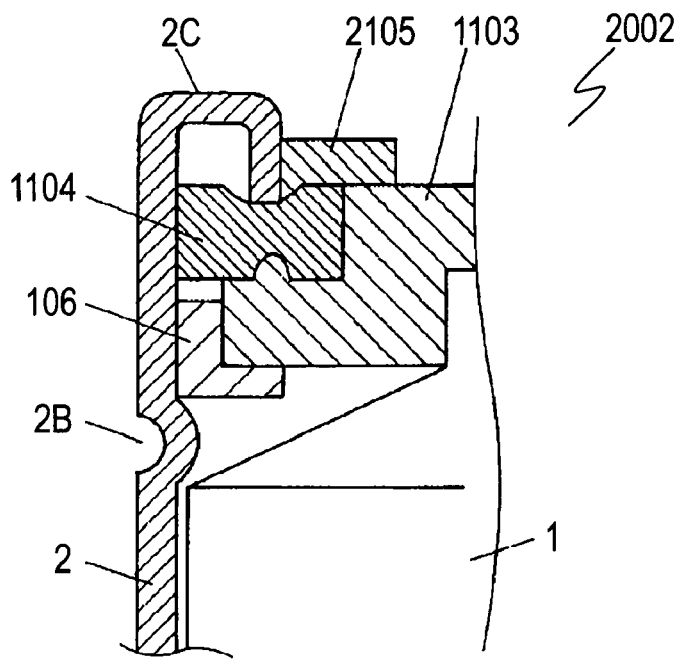
FIG. 11 is a cross sectional view of an essential part of another capacitor of Embodiment 4.

FIG. 11 is a cross sectional view of an essential part of another capacitor 2002 according to Embodiment 4. The same components as those of the capacitor 2001 shown in FIGS. 8A, 8B, and 9 are denoted by the same reference numerals, and their description will be omitted. The capacitor 2002 includes a terminal plate 1103, a sealing rubber 1104, and an insulator 2105 instead of the terminal plate 103, the sealing rubber 104, and the insulator 105 of the capacitor 2001. The capacitor 2002 further includes an insulating ring 106 having a cross section having an L-shape. The terminal plate 1103 is made of aluminum. The insulating ring 106 insulates between the terminal plate 1103 and the metal case 2. The sealing rubber 1104, similarly to the sealing rubber 4 of the capacitor 1001 shown in FIG. 2B, seals between the terminal plate 1103 and the metal case 2. The insulator 2105 covers the sealing rubber 1104 to prevent the sealing rubber 1104 from exposing from between the metal case 2 and the terminal plate 1103, thus providing the same effects as those of the insulator 105 shown in FIG. 9.

Exemplary Embodiment 5

Figure 12:
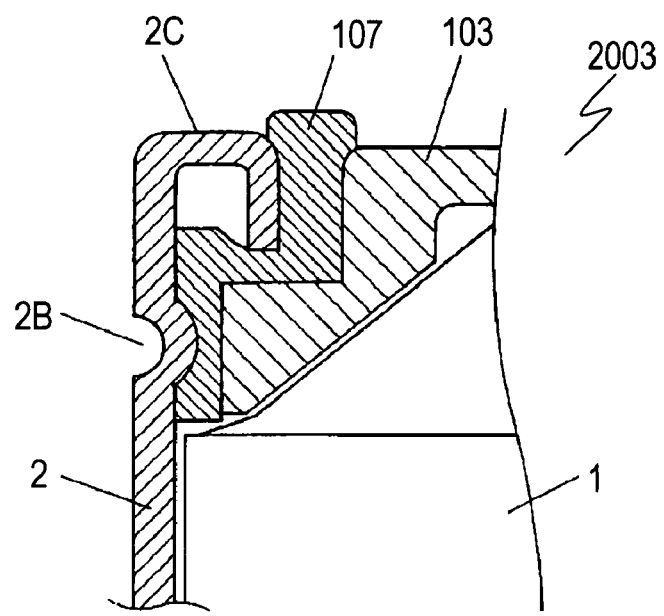
FIG. 12 is a cross sectional view of an essential part of a capacitor according to Exemplary Embodiment 5 of the invention.

FIG. 12 is a cross sectional view of an essential part of a capacitor 2003 according to Exemplary Embodiment 5 of the present invention. The same components as those of the capacitor 2001 according to Embodiment 4 shown in FIGS. 8A, 8B, and 9 are denoted by the same reference numerals, and their description will be omitted.

The capacitor 2003 includes a sealing rubber 107 instead of the sealing rubber 104 and the insulator 105 of the capacitor 2001 shown in FIG. 9. The sealing rubber 107 functions as a combination of the sealing rubber 104 and the insulator 105 shown in FIG. 9, and is made of material identical to that of the insulator 105. This structure prevents a recess from being provided between the terminal plate 103 and the metal case 2.

Figure 13:
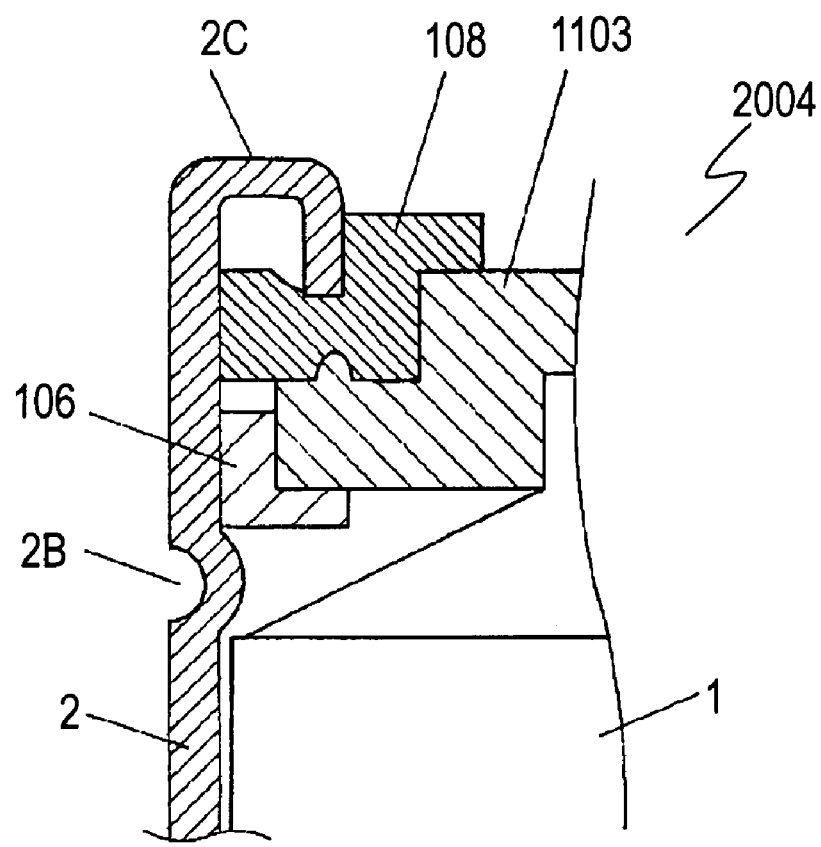
FIG. 13 is a cross sectional view of an essential part of another capacitor according to Embodiment 5.

FIG. 13 is a cross sectional view of an essential part of another capacitor 2004 according to Embodiment 5 of the present invention. The same components as those of the capacitor 2002 according to Embodiment 4 shown in FIG. 11 are denoted by the same reference numerals, and their description will be omitted.

The capacitor 2004 includes a sealing rubber 108 instead of the sealing rubber 1104 and the insulator 2105 of the capacitor 2002 shown in FIG. 11. The sealing rubber 108 functions as a combination of the sealing rubber 1104 and the insulator 2105 shown in FIG. 11 and is made of material identical to that of the insulator 2105. This structure prevents a recess from being provided between the terminal plate 1103 and the metal case 2.

In the capacitors 2003 and 2004 according to Embodiment 5, the sealing rubber is provided unitarily with the insulator, thus reducing the number of components and the number of processes for assembling the components in addition to the advantages of the capacitors 2001 and 2002 according to Embodiment 4, thus reducing cost.

Exemplary Embodiment 6

Figure 14:
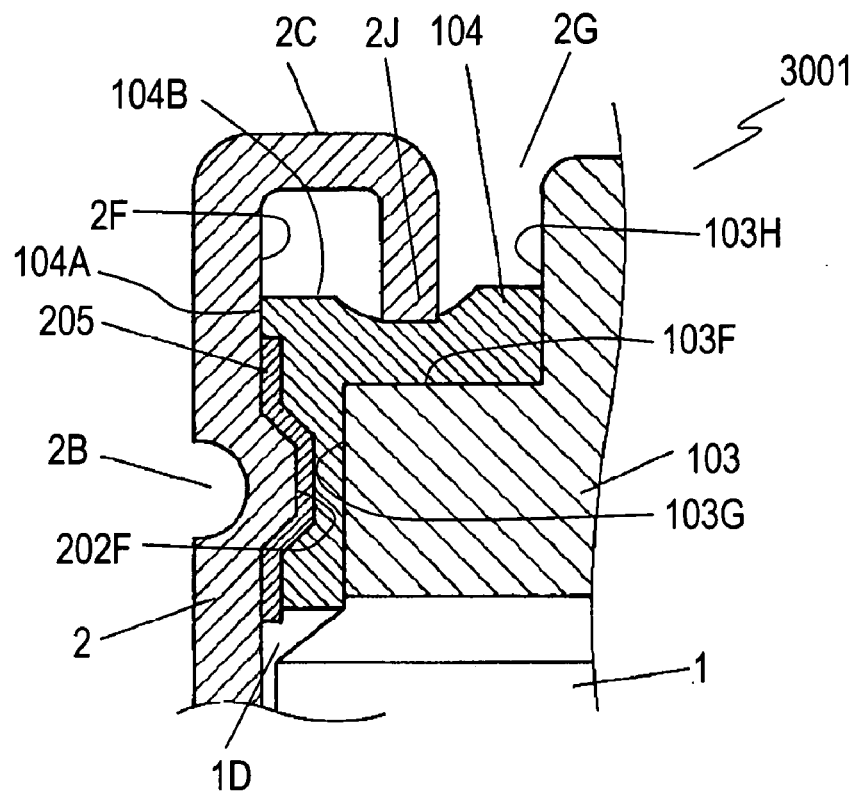
FIG. 14 is a cross sectional view of an essential part of a capacitor according to Exemplary Embodiment 6 of the invention.

FIG. 14 is a cross sectional view of an essential part of a capacitor 3001 according to Exemplary Embodiment 6 of the present invention. He same components as those of the capacitor 2001 according to Embodiment 4 shown in FIG. 9 are denoted by the same reference numerals, and their description will be omitted.

The sealing rubber 104 having the ring shape and having a cross section having the inverted L-shape in contacts the step surface 103F and the outer edge surface 103G connected to the step surface 103F of the terminal plate 103. The outer surface 104A of the sealing rubber 104 contacts the inner surface 2F of the metal case 2. While the sealing rubber 104 is compressed with the narrowed portion, the upper surface 104B of the sealing rubber 104 is compressed down with the curled portion 2C of an end 2J of the metal case 2 at the opening 2G, thereby sealing between the metal case 2 and the terminal plate 103 to seal the opening 2G.

An insulator 205 having an annular shape is provided between the outer surface 104A of the sealing rubber 104 and the inner surface 202F of the narrowed portion 2B of the metal case 2, and contacts the outer surface 104A of the sealing rubber 104 and the inner surface 202F of the narrowed portion 2B of the metal case 2. The insulator 205 may be made of mixture of one selected from butyl rubber (IIR), ethylene propylene rubber (EPT), and styrene butadiene rubber (SBR), and one selected from cycloaliphatic petroleum resin, aliphatic petroleum resin, and terpene resin. The insulator 205 is formed by applying material containing organic solvent and rubber, such as butyl rubber (IIR), dispersed therein, and drying the material to evaporate the organic solvent.

Plural capacitors 3001 can be joined to one another while the surfaces of the curled portions 2C are connected to a coupling board by laser welding. In the case that the insulator 205 is provided on an inner surface of the curled portion 2C of the metal case 2, the laser welding may burn and vaporize the insulator 205, thereby producing an aperture therein. Therefore, the insulator 205 is necessarily prevented from being positioned on the inner surface of the curled portion 2C.

In the capacitor 3001 according to Embodiment 6, the insulator 205 prevents the electrolyte 1D from flowing into the interface between the metal case 2 and the sealing rubber 104. Thus, the insulator 205 prevents the sealing rubber 104 from deteriorating and prevents the electrolyte 1D from leaking from the interface, thus providing the capacitor 3001 with high reliability.

The insulator 205 has a thickness preferably ranging from 2 μm to 100 μm. The thickness of the insulator smaller than 2 μm does not provide the above effects. The thickness of the insulator exceeding 100 μm prevents the capacitor 3001 from reducing cost.

Figure 15:
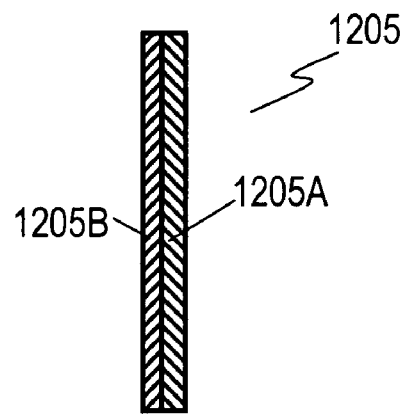
FIG. 15 is a cross sectional view of another insulator of the capacitor according to Embodiment 6.

FIG. 15 is a cross sectional view of another insulator 1205 of the capacitor 3001. The insulator 1205 includes a resin film 1205A and a rubber layer 1205B provided on the resin film 1205A. The rubber layer 1205B may be made of mixture of one selected from butyl rubber (IIR), ethylene propylene rubber (EPT), and styrene butadiene rubber (SBR) and one selected from cycloaliphatic petroleum resin, aliphatic petroleum resin, and terpene resin. The resin film 1205A may be made of one selected from polyethylene (PE), polyethylene terephthalate (PET), polypropylene (PP), polyphenylene sulfide (PPS), tetra-fluoro-ethylene perfluoro-alkyl-vinyl-ether copolymer (PFA), ethylene fluoride propylene copolymer (FFP), polyvinylidene fluoride (PVDF), ethylene tetra-fluoro-ethylene copolymer (ETFE), and poly-tetra-fluoro-ethylene (PTFE).

Figure 16:
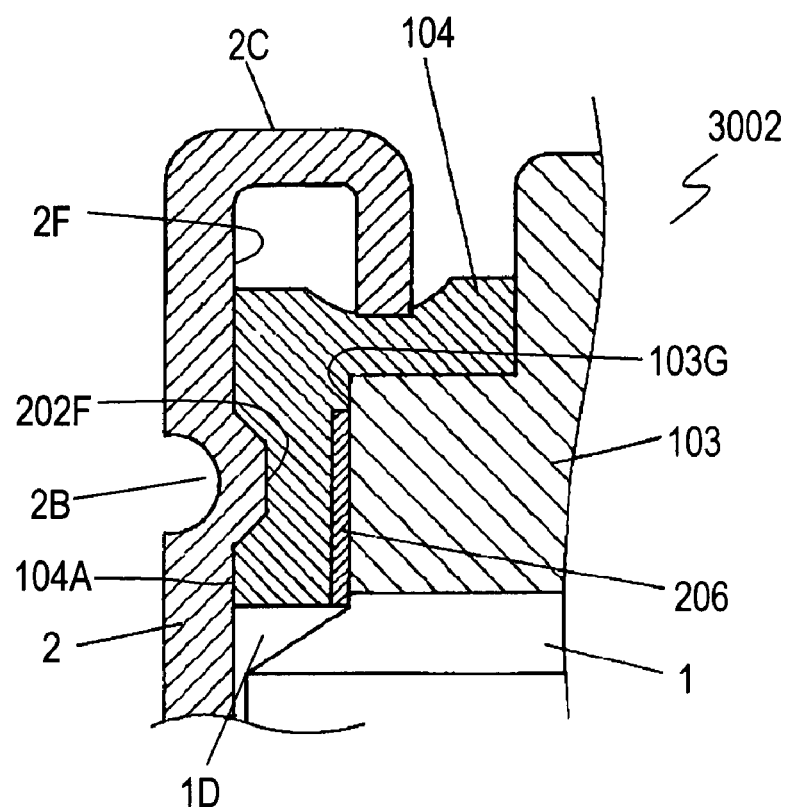
FIG. 16 is a cross sectional view of an essential part of another capacitor according to Embodiment 6.

FIG. 16 is a cross sectional view of an essential part of another capacitor 3002 according to Embodiment 6. The same components as those of the capacitor 3001 shown in FIG. 14 are denoted by the same reference numerals, and their description will be omitted. The capacitor 3002 includes an insulator 206 instead of the insulator 205 of the capacitor 3001 shown in FIG. 14. The insulator 206 is provided between the outer edge surface 103G of the terminal plate 103 and the sealing rubber 104, and contacts the outer edge surface 103G of the terminal plate 103 and the sealing rubber 104. The outer surface 104A of the sealing rubber 104 contacts the inner surfaces 2F and 202F of the metal case 2.

In the capacitor 3002, the insulator 206 prevents the electrolyte 1D from entering into the interface between the terminal plate 103 and the sealing rubber 104. Thereby, the insulator 206 prevents the sealing rubber 104 from deteriorating and prevents the electrolyte 1D from leaking from the interface, thus providing the capacitor 3002 with high reliability.

The insulator 206 has a thickness preferably ranging from 2 μm to 100 μm. The thickness of the insulator smaller than 2 μm does not provide the above effects. The thickness of the insulator exceeding 100 μm prevents the capacitor 3002 from reducing cost.

Figure 17:
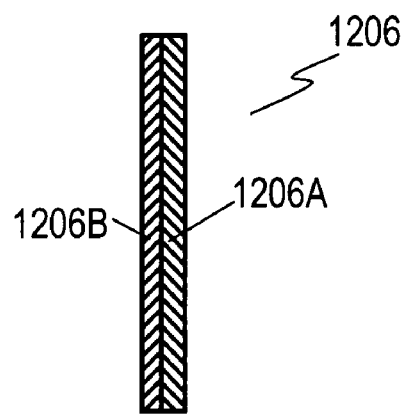
FIG. 17 is a cross sectional view of another insulator of the capacitor shown in FIG. 16.

FIG. 17 is a cross sectional view of another insulator 1206 of the capacitor 3002. The insulator 1206 includes a resin film 1206A and a rubber layer 1206B provided on the resin film 1206A. The rubber layer 1206B may be made of mixture of one selected from butyl rubber (IIR), ethylene propylene rubber (EPT), and styrene butadiene rubber (SBR) and one selected from cycloaliphatic petroleum resin, aliphatic petroleum resin, and terpene resin. The resin film 1206A may be made of one selected from polyethylene (PE), polyethylene terephthalate (PET), polypropylene (PP), polyphenylene sulfide (PPS), tetra-fluoro-ethylene perfluoro-alkyl-vinyl-ether copolymer (PFA), ethylene fluoride propylene copolymer (FFP), polyvinylidene fluoride (PVDF), ethylene tetra-fluoro-ethylene copolymer (ETFE), and poly-tetra-fluoro-ethylene (PTFE).

Figure 18:
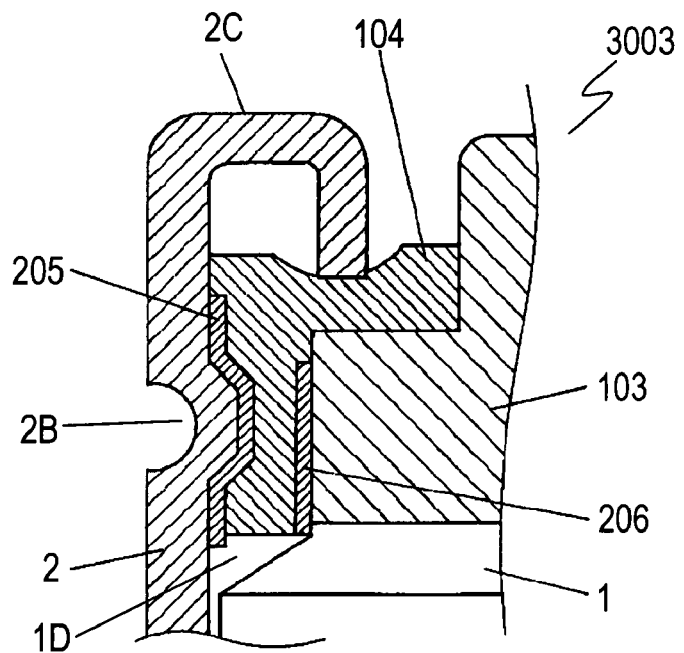
FIG. 18 is a cross sectional view of an essential part of a further capacitor according to Embodiment 6.

FIG. 18 is a cross sectional view of an essential part of a further capacitor 3003 according to Embodiment 6. The same components as those of the capacitor 3001 shown in FIG. 14 are denoted by the same reference numerals, and their description will be omitted. The capacitor 3003 includes the components of the capacitor 3001 shown in FIG. 14 and further includes the insulator 206 shown in FIG. 16.

In the capacitor 3003, the insulators 205 and 206 prevent the electrolyte 1D from entering into the interface between the metal case 2 and the sealing member 104 and the interface between the terminal plate 103 and the sealing rubber 104. The insulator 205 and 206 prevent the sealing rubber 104 from deteriorating and prevent the electrolyte 1D from leaking from the interfaces, thus providing the capacitor 3003 with high reliability.

Exemplary Embodiment 7

Figure 19:
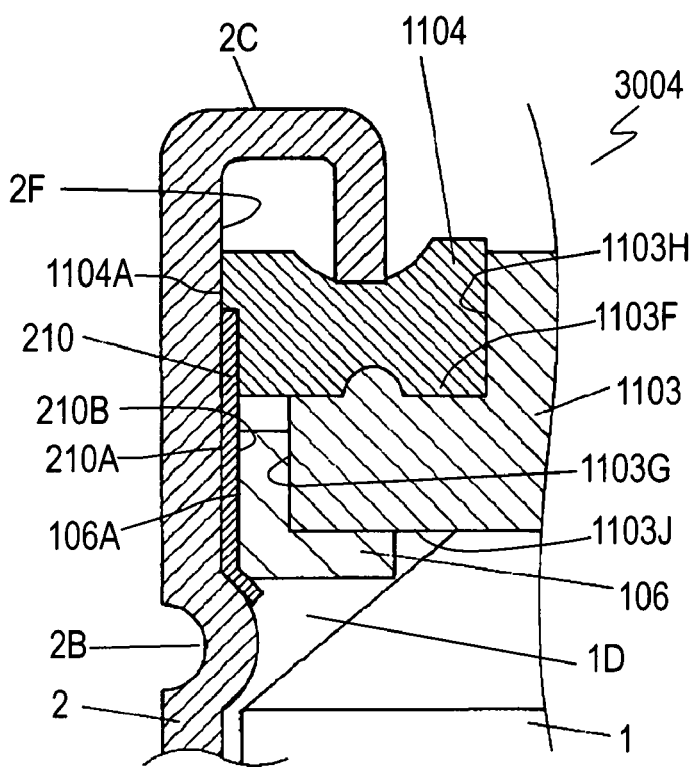
FIG. 19 is a cross sectional view of an essential part of a capacitor according to Exemplary Embodiment 7 of the invention.

FIG. 19 is a cross sectional view of an essential part of a capacitor 3004 according to Exemplary Embodiment 7 of the present invention. The same components as those of the capacitor according to Embodiment 4 shown in FIG. 11 are denoted by the same reference numerals, and their description will be omitted. The capacitor 3004 includes an insulator 210 instead of the insulator 205 of the capacitor 2002.

The insulating ring 106 having an annular shape is provided on an upper end of the narrowed portion 2B of the metal case 2 for positioning and fixing the terminal plate 1103. The outer surface 1104A of the sealing rubber 1104 contacts the inner surface 2F of the metal case 2.

The terminal plate 1103 made of aluminum has an outer edge surface 1103H and an outer edge surface 1103G provided at the upper part and the lower part of the outer edge surface of the terminal plate 1103, respectively. The diameter of the terminal plate at the outer edge surface 1103H is smaller than that at the outer edge surface 1103G. The outer edge surface of the terminal plate 1103 has a step surface 1103 having an annular shape connected to the outer edge surfaces 1103H and 1103G. The outer edge surface 1103H of the terminal plate 1103 faces the metal case 2. The outer edge surface 1103G faces the metal case 2 and is closer to the metal case 2 than the outer edge surface 1103H is. The step surface 1103F between the outer edge surfaces 1103G and 1103H and is connected to the outer edge surfaces 1103G and 1103H.

The inner surface 210B of the insulator 210 having an annular shape contacts the outer surface 106A of the insulating ring 106 and the outer surface 1104A of the sealing rubber 1104. The outer surface 210A of the insulator 210 contacts the inner surface 2F of the metal case 2. That is, the insulator 210 contacts the sealing rubber 1104 and the metal case 2, and extends to between the sealing rubber 1104 and the metal case 2. The outer edge surface 1103G of the terminal plate 1103 faces the metal case 2. The inner surface 1103J faces the inside of the metal case 2. The insulating ring 106 extends continuously along the outer edge surface 1103G and the inner surface 1103J of the terminal plate 1103. The insulator 210 is made of material identical to that of the insulators 205 and 206 according to Embodiment 6, and is manufactured by the same method of that of the insulators 205 and 206.

The capacitor 3004, similarly to the capacitor 3001 according to Embodiment 6, prevents the electrolyte 1D from creeping upward along the inner surface 2F so as to prevent the sealing rubber 1104 from deteriorating and to prevent the electrolyte 1D from leaking, thus providing the capacitor 3004 with high reliability.

Figure 20:
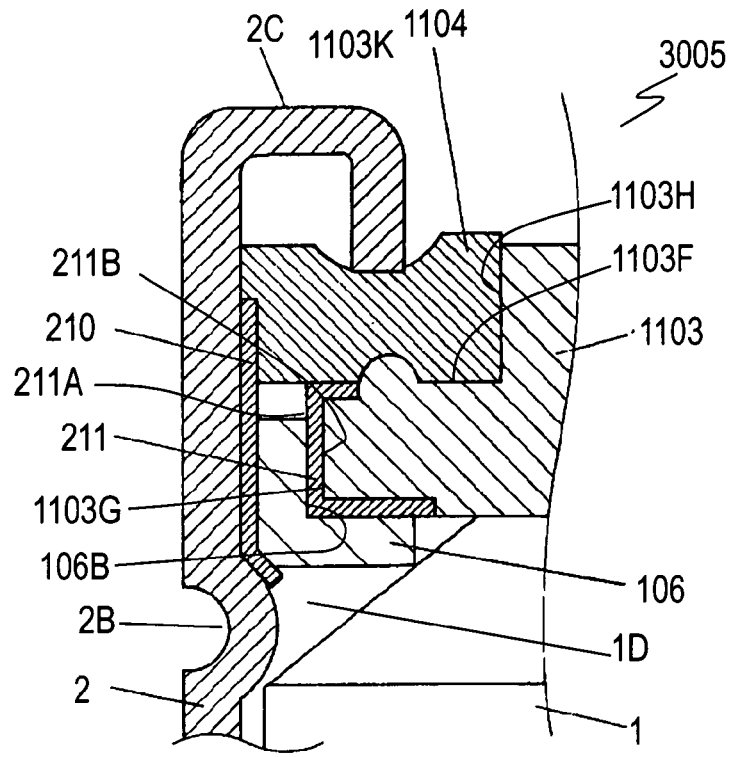
FIG. 20 is a cross sectional view of an essential part of another capacitor according to Embodiment 7.

FIG. 20 is a cross sectional view of an essential part of another capacitor 3005 according to Embodiment 7. The same components as those of the capacitor 3004 shown in FIG. 19 are denoted by the same reference numerals, and their description will be omitted. The capacitor 3005 includes the components of the capacitor 3004 and further includes an insulator 211. The insulator 211 is provided between the insulating ring 106 and the terminal plate 1103 for preventing the insulating ring 106 from contacting the terminal plate 1103. The insulator 211 extends to between the sealing rubber 1104 and a portion 1103K of the step surface 1103F of the terminal plate 1103 contacting the sealing rubber 1104. The outer surface 211A of the insulator 211 contacts the inner surface 106B of the insulating ring 106. The inner surface 211B contacts the outer edge surface 1103G of the terminal plate 1103. The insulator 211 is made of material identical to that of the insulator 210, and is manufactured by the same method as the insulator 210.

The capacitor 3005, similarly to the capacitor 3004, prevents the electrolyte 1D from creeping upward along the inner surface 2F, the outer edge surface 1103G of the terminal plate 1103, and the inner surface 106B of the insulating ring 106 so as to prevent the sealing rubber 1104 from deteriorating and to prevent the electrolyte 1D from leaking, thus providing the capacitor 3005 with high reliability.

Figure 21:
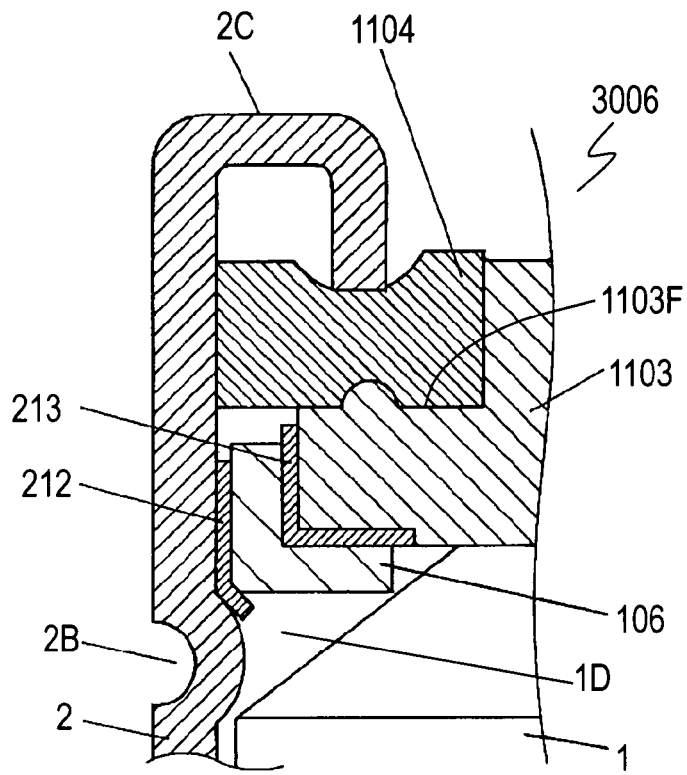
FIG. 21 is a cross sectional view of an essential part of a further the capacitor according to Embodiment 7.

FIG. 21 is a cross sectional view of an essential part of a further capacitor 3006 according to Embodiment 7. The same components as those of the capacitor 3005 shown in FIG. 20 are denoted by the same reference numerals, and their description will be omitted. The capacitor 3006 includes insulators 212 and 213 instead of the insulators 210 and 211 of the capacitor 3005.

The insulator 212 is provided between the insulating ring 106 and the metal case 2, but does not extend to between the sealing rubber 1104 and the metal case 2, differently from the insulator 210 shown in FIG. 20. The insulator 213 is provided between the insulating ring 106 and the terminal plate 1103, but does not extend to between the terminal plate 1103 and the sealing rubber 1104, differently from the insulator 211 shown in FIG. 20. The insulators 212 and 213 may be made of material identical to that of the insulators 210 and 211, and may be manufactured by the same method as the insulators 210 and 211. The insulators 212 and 213 provide the same effect for preventing the electrolyte 1D from leaking.

Exemplary Embodiment 8

Figure 22:
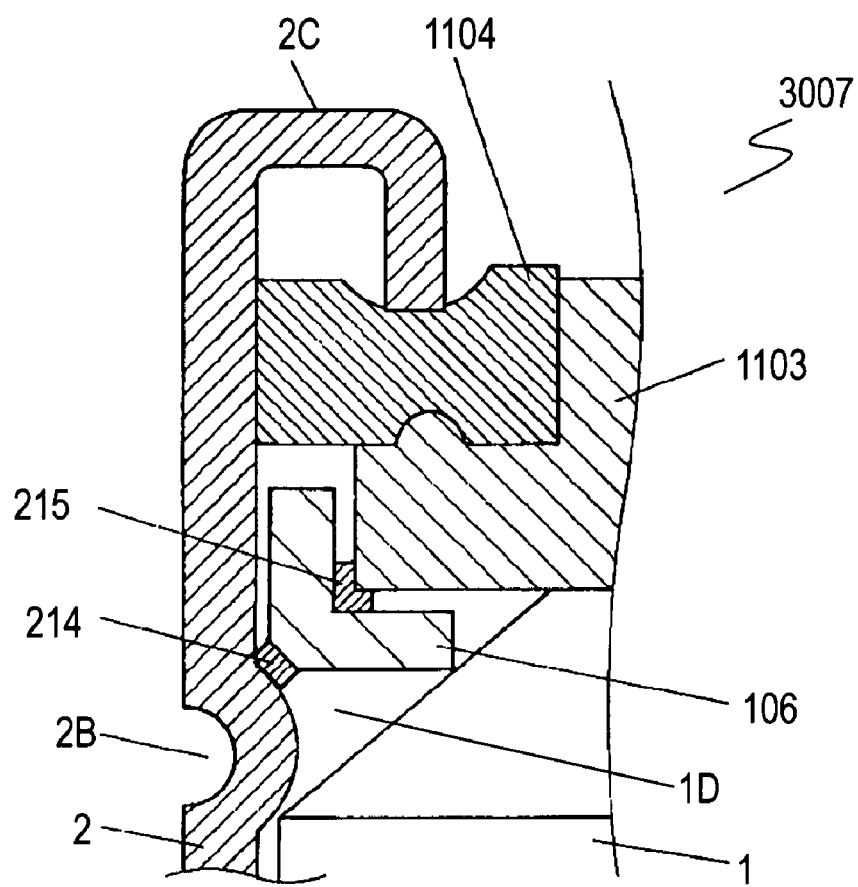
FIG. 22 is a cross sectional view of an essential part of a capacitor according to Exemplary Embodiment 8 of the invention.

FIG. 22 is a cross sectional view of an essential part of a capacitor 3007 according to exemplary Embodiment 8 of the present invention. In FIG. 22, the same components as those of the capacitor 3006 according to Embodiment 7 shown in FIG. 21 are dented by the same reference numerals, and their description will be omitted. The capacitor 3007 includes insulators 214 and 215 instead of the insulators 212 and 213 of the capacitor 3006 shown in FIG. 21.

The insulator 214 is provided between the insulating ring 106 and the metal case 2. The insulator 215 is provided partially between the insulating ring 106 and the terminal plate 1103. The insulating ring 106 may be made by molding insulating resin material, such as polyphenylene sulfide, polypropylene, or nylon. The insulators 214 and 215 are formed by applying mixture of one selected from butyl rubber (IIR), ethylene propylene rubber (EPT), and styrene butadiene rubber (SBR) and one selected from cycloaliphatic petroleum resin, aliphatic petroleum resin, and terpene resin, and drying the applied mixture to vaporize organic solvent in the mixture. The insulators 214 and 215 provide the same effects as the insulators of the capacitors 3001 to 3006 according to Embodiments 6 and 7, for example, preventing the electrolyte 1D from leaking. The insulators 214 and 215 may be made of denatured polypropylene, polypropylene, or polyethylene terephthalate.

Exemplary Embodiment 9

Figure 23:
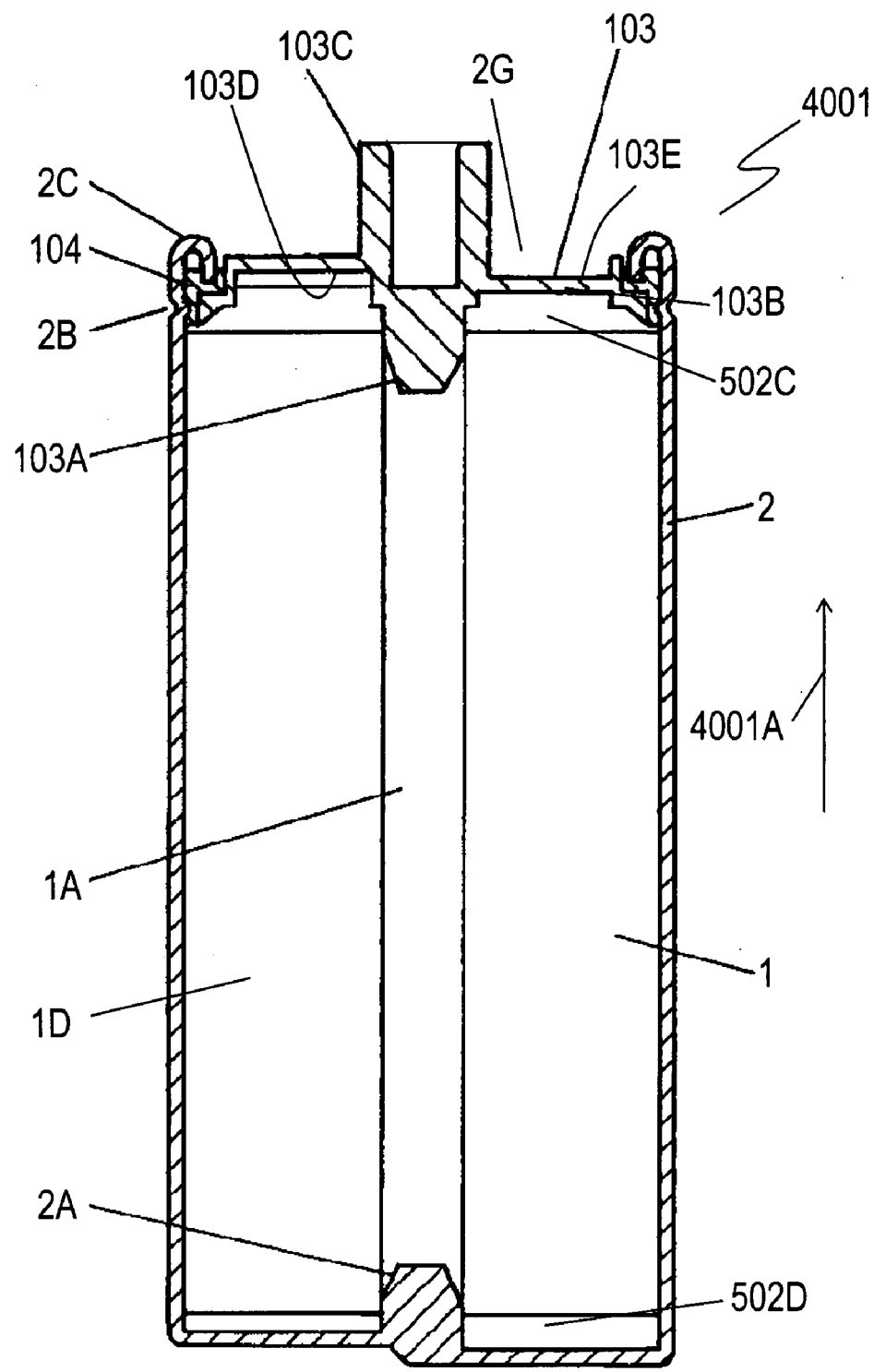
FIG. 23 is a cross sectional view of a capacitor according to Exemplary Embodiment 9 of the invention.
Figure 24:
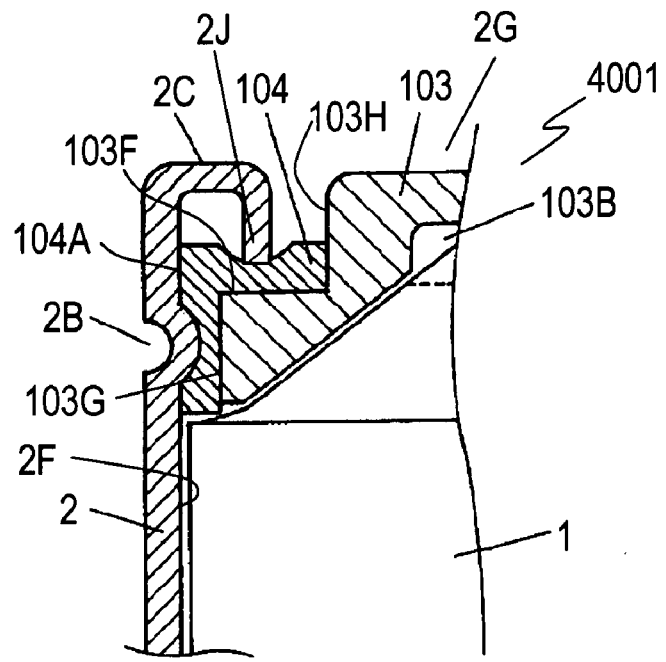
FIG. 24 is a cross sectional view of an essential part of the capacitor according to Embodiment 9.

FIG. 23 is a cross sectional view of a capacitor 4001 according to Exemplary Embodiment 9 of the present invention. FIG. 24 is a cross sectional view of an essential part of the capacitor 4001. In FIGS. 23 and 24, the same components as those of the capacitor 2001 shown in FIGS. 8A, 8B, and 9 are denoted by the same reference numerals, and their description will be omitted. The capacitor element 1 is accommodated together with the electrolyte 1D in the metal case 2.

The terminal plate 103 made of aluminum has an outer edge surface 103H and an outer edge surface 103G provided at the upper part and the lower part of an outer edge surface of the terminal plate, respectively. The diameter of the terminal plate at the outer edge surface 103H is smaller than that at the outer edge surface 103G. The outer edge surface of the terminal plate 103 has a step surface 103F having an annular shape and connected to the outer edge surfaces 103H and 103G. The terminal plate 103 has a projection 103A provided on the inner surface 103D of the terminal plate 103. The terminal plate 103 further has bumps 103B provided on the inner surface 103D thereof and a threaded portion 103C provided on the outer surface 103E thereof for external connection. While the projection 103A is engaged into the hollow 1A provided in the capacitor element 1, the bumps 103B of the terminal plate 103 is joined mechanically and electrically to the end surface 1B of the capacitor element 1 by a joining method, such as laser welding.

The sealing rubber 104 having a ring shape has a cross section having an inverted L-shape, and contacts the step surface 103F and the outer edge surface 103G of the terminal plate 103. The outer surface 104A of the sealing rubber 104 contacts the inner surface 2F of the metal case 2. The outer surface 104A of the sealing rubber 104 is compressed inward with the narrowed portion 2B of the metal case 2. An end 2J of the metal case 2 at the opening 2G is bent inward to form a curled portion 2C. The upper surface 104B of the sealing rubber 104 is compressed with the curled portion 2C, seals between the metal case 2 and the terminal plate 103, and insulates the metal case 2 from the terminal plate 103.

In the capacitor 4001, the diameter of a portion of the metal case 2 facing the outer edge surface of the terminal plate 103 is reduced locally to provide the narrowed portion 2B of the metal case 2, thus nor requiring a space of the metal case 2 between the terminal plate 103 and the capacitor element 1 for a narrowing process. The capacitor element 1 may extends to this space, accordingly providing the capacitor 4001 with a small size, a large capacitance, a small resistance, and a low cost.

The sealing rubber 104 is compressed by the narrowing process performed for the metal case 2, the inner surface 2F of the metal case 2 along which water flows may have a large length. Accordingly, the capacitor 4001 is prevented from water from entering therein, thus increasing the operating life of the capacitor 4001.

The electrodes 502C and 502D of the capacitor element 1 can be drawn in one direction 4001A from the terminal plate 103 and the metal case 2. Hence, the capacitor 4001 can be connected easily and reduces a space for the connection.

Exemplary Embodiment 10

Figure 25:
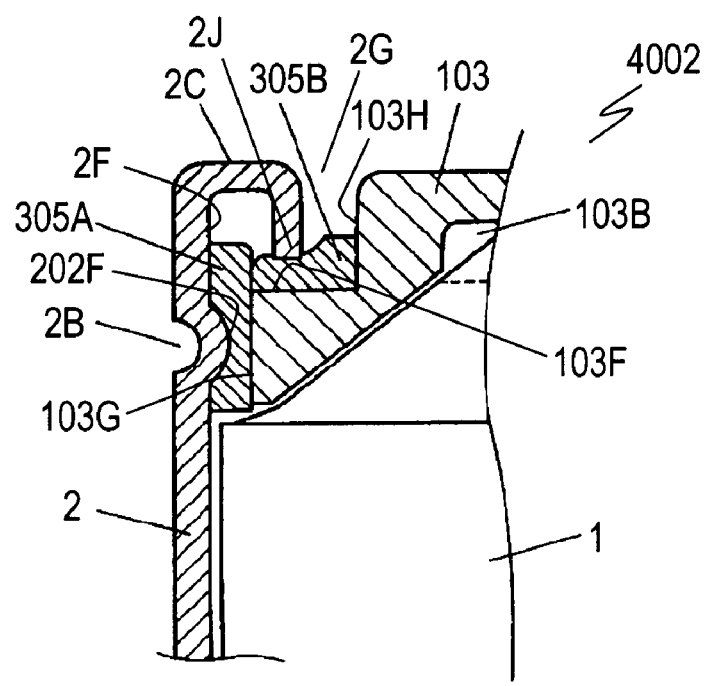
FIG. 25 is a cross sectional view of an essential part of a capacitor according to Exemplary Embodiment 10 of the invention.

FIG. 25 is a cross sectional view of an essential part of a capacitor 4002 according to Exemplary Embodiment 10 of the present invention. In FIG. 25, the same components as those of the capacitor 4001 shown in FIG. 24 are denoted by the same reference numerals, and their description will be omitted. The capacitor 4002 includes sealing rubbers 305A and 305B instead of the sealing rubber 104 of the capacitor 4001.

As shown in FIG. 25, the sealing rubber 305A is provided between the outer edge surface 103G of the terminal plate 103 and the inner surface 2F of the metal case 2. The sealing rubber 305B is provided on the step surface 103F of the terminal plate 103. That is, the sealing rubbers 305A and 305B are equivalent to portions into which the sealing rubber 104 shown in FIG. 24 is divided, respectively.

In the capacitor 4002, an outer edge surface of the sealing rubber 305B is not pulled towards an opening 2G when the narrowing process is performed to the end 2J of the metal case 20 at the opening 2G to form the narrowed portion 2B. Hence, the capacitor 4002 allows the sealing rubbers to have sealing effects more stably than the capacitor 4001 according to Embodiment 9.

Exemplary Embodiment 11

Figure 26:
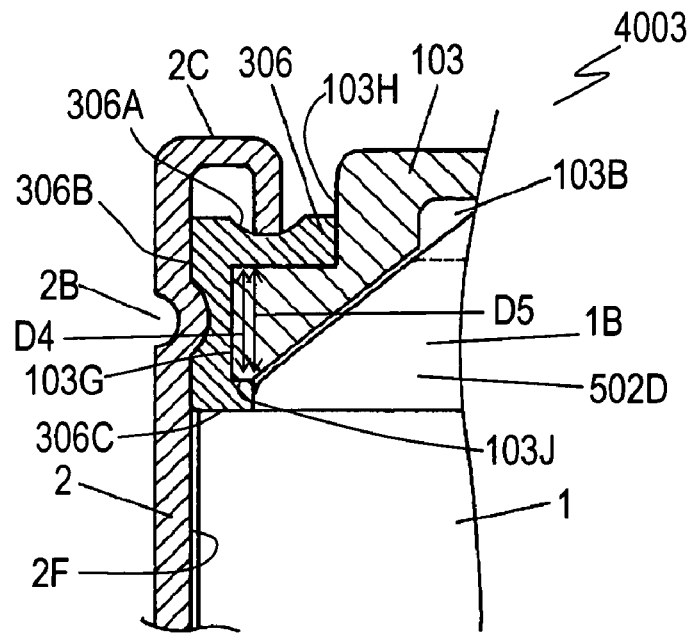
FIG. 26 is a cross sectional view of an essential part of a capacitor according to Exemplary Embodiment 11 of the invention.

FIG. 26 is a cross sectional view of an essential part of a capacitor 4003 Exemplary Embodiment 11 of the present invention. In FIG. 26, the same components as those of the capacitor 4001 according to Embodiment 9 shown in FIG. 24 are denoted by the same reference numerals, and their description will be omitted. The capacitor 4003 includes a sealing rubber 306 instead of the sealing rubber 104 of the capacitor 4001.

The sealing rubber 306 has a cross section having a squared C-shape. The outer edge surface 103H of the terminal plate 103 faces the metal case 2. The outer edge surface 103G faces the metal case 2 and is closer to the metal case 2 than the outer edge surface 103H is. The step surface 103F is provided between the outer edge surfaces 103G and 103H, and is connected to the outer edge surfaces 103G and 103H. The terminal plate 103 has an inner surface 103J facing the inside of the metal case 2. The sealing rubber 306 has portions 306A, 306B, and 306C contacting the step surface 103F, the outer edge surface 103G, and the inner surface 103J of the terminal plate 103, respectively, and is engaged with the terminal plate 103. The portion 306A of the sealing rubber 306 is connected to the portion 306B while the portion 306B is connected to the portion 306C. Before the sealing rubber 306 is engaged to the terminal plate 103, the distance D4 between the surface 306A and the surface 306C of the sealing rubber 306 is smaller than the thickness between the step surface 103F to the inner surface 103J of the terminal plate 103. That is, the sealing rubber 103 applies a pressure to the terminal plate 103.

In the capacitor 4003 according to Embodiment 11, the sealing rubber 306 applies the pressure to the terminal plate 103 to pinch the terminal plate 103. This structure prevents the sealing rubber 306 from being displaced when the metal case 2 is subjected to the narrowing process to form the narrowed portion 2B or the curling process to form the curled portion 2C. Accordingly, the sealing rubber 306 has stable sealing effects, hence improving the electrical insulation between the electrode 502D at the end surface 1B of the capacitor element 1 and the inner surface 2F of the metal case 2.

Exemplary Embodiment 12

Figure 27:
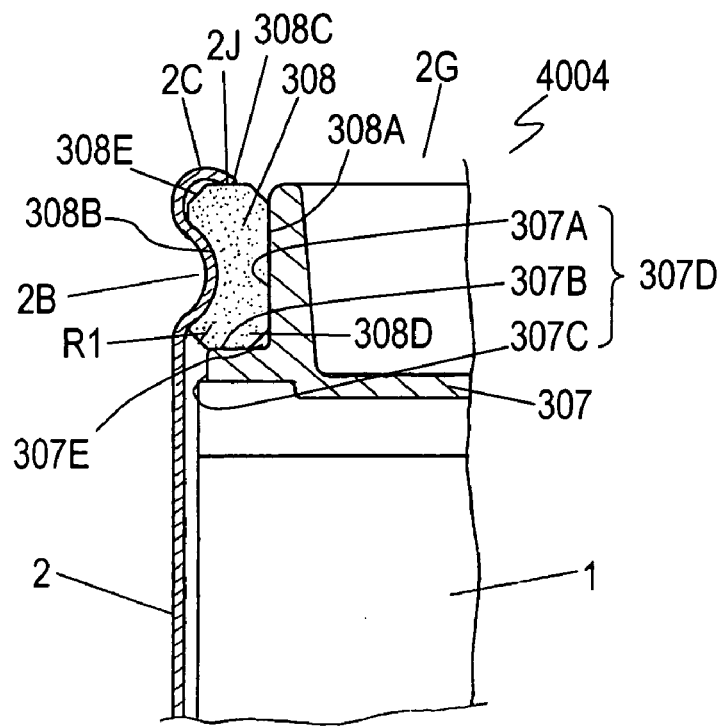
FIG. 27 is a cross sectional view of an essential part of a capacitor according to Exemplary Embodiment 12 of the invention.

FIG. 27 is a cross sectional view of an essential part of a capacitor 4004 according to Exemplary Embodiment 12 of the present invention. In FIG. 27, the same components as those of the capacitor 4001 according to Embodiment 9 shown in FIG. 24 are denoted by the same reference numerals, and their description will be omitted. The capacitor 4004 includes a terminal plate 307 and a sealing rubber 308 instead of the terminal plate 103 and the sealing rubber 104 of the capacitor 4001.

The outer edge surface 307D of the terminal plate 307 made of aluminum includes an outer edge surface 307A, an outer edge surface 307C having a diameter larger than that of the outer edge surface 307A, and an step surface 307B having an annular shape and provided between the outer edge surfaces 307A and 307C. The step surface 307B is connected to the outer edge surfaces 307A and 307C.

The sealing rubber 308 having an annular shape has a cross section having substantially a rectangular shape. An inner surface 308A of the sealing rubber 308 contacts the outer edge surface 307A of the terminal plate 307. The narrowed portion 2B of the metal case 2 is formed by locally reducing the diameter of the metal case 2. The end 2J of the metal case 2 at the opening 2G is bent inward to form the curled portion 2C. The outer surface 308B and the upper surface 308C of the sealing rubber 308 are compressed with the narrowed portion 2B and the curled portion 2C of the metal case 2, respectively, and accordingly seals securely between the metal case 2 and the terminal plate 307.

In the capacitor 4004, the outer surface 308B of the sealing rubber 308 may have a large area to increase the amount of the compressing of the sealing rubber 308 by the narrowed portion 2B, accordingly having large sealing effects and providing the capacitor 4004 with high reliability. The sealing rubber 308 has the annular shape and the cross section having the rectangular shape, a simple shape, accordingly being manufactured easily.

The sealing rubber has the cross section of the rectangular shape, and the rectangular shape is chamfered at each corner. A taper surface 307E is provided between the outer edge surface 307A and the step surface 307B of the terminal plate 307, thereby allowing the outer edge surface 307D to be formed easily. In this case, a corner of the cross section of the sealing rubber 308 is preferably chamfered to be prevented from contacting the taper surface 307E. A corner 308E of the sealing rubber 308 diagonally opposite to the corner 308D facing the taper surface 307E may be preferably chamfered so as to stabilize the shape of the curled portion 2C formed by curling the end 2J of the metal case 2. In the case that the corners 308D and 308E diagonally opposite to each other are chamfered, all the corners of the sealing rubber 308 may be preferably chamfered to avoid the controlling of up and down orientations of the sealing rubber 308. Alternatively, the cross section of the sealing rubber 308 may be substantially a square shape.

The corners of the cross section of the sealing rubber 308 may not be chamfered. In this case, a corner of the sealing rubber 308 contacts the taper surface 307E of the terminal plate 307, and produces a small gap between the sealing rubber 308 and the terminal plate 307. This gap disappears when the sealing rubber 308 is compressed with the narrowed portion 2B of the metal case 2. This gap functions as a buffer space during the forming of the narrowed portion 2B of the metal case 2, and protecting the capacitor element 1 from being pushed excessively with the terminal plate 307.

INDUSTRIAL APPLICABILITY

A capacitor according to the present invention prevents a electrolyte from leaking and has high reliability, thus being useful as capacitors for various electronic appliances and vehicles.

The invention claimed is:

1. A capacitor comprising:
   a metal case having a cylindrical shape having an opening and a bottom;
   a capacitor element accommodated in the metal case, the capacitor element having a first electrode and a second electrode;
   an electrolyte accommodated in the metal case; and
   a sealing rubber sealing the opening of the metal case while the sealing rubber is compressed to have a stress applied thereto, the stress being not lower than 0.5 MPa and not higher than a predetermined value.

2. The capacitor according to claim 1, wherein
   the sealing rubber is made of rubber material having a breaking elongation rate of R (%) and Young's modulus of F (N/cm$^2$), and
   the predetermined value Ymax (MPa) of the stress is determined by the following formula, $Ymax = (R-100) \times 0.0001 \times F$.

3. The capacitor according to claim 1, further comprising
   a terminal plate provided at the opening of the metal case and electrically connected to the first electrode of the capacitor element, wherein
   the second electrode is electrically connected to the metal case, and
   the sealing rubber is provided between the metal case and the terminal plate to seal the opening of the metal case with the terminal plate.

4. The capacitor according to claim 3, wherein
   the opening of the metal case and the terminal plate have circular shapes,
   the sealing rubber contacts the metal case and the terminal plate, and
   the sealing rubber has a ring shape having an inner diameter smaller than an outer diameter of the terminal plate.

5. The capacitor according to claim 4, wherein the ring shape of the sealing rubber has an outer diameter larger than an inner diameter of the opening of the metal case before sealing the opening.

6. The capacitor according to claim 3, wherein
   the opening of the metal case and the terminal plate have circular shapes,
   the sealing rubber contacts the metal case and the terminal plate, and
   the sealing rubber has a ring shape having an outer diameter larger than an inner diameter of the opening of the metal case before sealing the opening.

7. The capacitor according to claim 1, wherein the sealing rubber has a first aperture and a second aperture provided therein through which the first electrode and the second electrode extend, respectively.

8. The capacitor according to claim 1, wherein
   the capacitor element includes
   a first collector made of metal foil,
   a first polarized layer provided on the first collector,
   a first separator made of insulating material and provided on the first polarized layer,
   a second collector made of metal foil and provided on the first separator,
   a second polarized layer provided on the second collector, and
   a second separator made of insulating material and provided on the second polarized layer,
   the first collector has a portion thereof exposing in a first direction, the portion of the first collector functioning as the first electrode, and
   the second collector has a portion thereof exposing in a second direction opposite to the first direction, the portion of the second collector functioning as the second electrode.

9. A method of manufacturing a capacitor, comprising:
   accommodating a capacitor element and an electrolyte in a metal case having an opening thereof;
   determining a compressed dimension of a sealing rubber according to Young's modulus of the sealing rubber; and
   sealing the opening of the metal case with the sealing rubber by compressing the sealing rubber with the metal case having the capacitor element and the electrolyte accommodated therein according to the determined compressed dimension.

10. A capacitor comprising:
    a metal case having an opening thereof, the metal case having a bent end at the opening;
    a capacitor element accommodated in the metal case, the capacitor element having a first electrode and a second electrode, the second electrode being electrically connected to the metal case;
    an electrolyte accommodated in the metal case;
    a terminal plate provided at the opening of the metal case, the terminal plate being electrically connected to the first electrode;
    a sealing rubber sealing between the terminal plate and the opening of the metal case while the sealing rubber is compressed with the end of the metal case, the sealing member having a portion exposing between the metal case and the terminal plate; and
    an insulator covering the portion of the sealing rubber.

11. The capacitor according to claim 10, wherein the insulator comprises mixture of one selected from butyl rubber, ethylene propylene rubber, and styrene butadiene rubber and one selected from cycloaliphatic petroleum resin, aliphatic petroleum resin, and terpene resin.

12. The capacitor according to claim 10, wherein the insulator includes
a resin film, and
a rubber layer provided on the resin film, the rubber layer comprising mixture of one selected from butyl rubber, ethylene propylene rubber, and styrene butadiene rubber and one selected from cycloaliphatic petroleum resin, aliphatic petroleum resin, and terpene resin.

13. The capacitor according to claim 12, wherein the resin film comprises one selected from polyethylene, polyethylene terephthalate, polypropylene, polyphenylene sulfide, tetra-fluoro-ethylene perfluoro-alkyl-vinyl-ether copolymer, ethylene fluoride propylene copolymer, polyvinylidene fluoride, ethylene tetra-fluoro-ethylene copolymer, and poly-tetra-fluoro-ethylene.

14. The capacitor according to claim 10, wherein the insulator is formed unitarily with the sealing rubber.

15. A capacitor comprising:
a metal case having a cylindrical shape having an opening thereof, the metal case having a bent portion at an end of the metal case which is curled inward to the opening and a narrowed portion at which a diameter is reduced locally;
a capacitor element accommodated in the metal case, the capacitor element having a first electrode and a second electrode, the second electrode electrically connected to the metal case;
an electrolyte accommodated in the metal case;
a terminal plate provided at the opening of the metal case, the terminal electrode being electrically connected to the first electrode;
a sealing rubber sealing between the opening of the metal case and the terminal plate while the sealing rubber is disposed between the narrowed portion of the metal case and the terminal plate and compressed by the narrowed portion of the metal case and the terminal plate; and
a first insulator contacting the sealing rubber, the first insulator being provided between the metal case and the terminal plate.

16. The capacitor according to claim 15, wherein the first insulator is provided between the metal case and the sealing rubber, and contacts the metal case.

17. The capacitor according to claim 15, further comprising
a second insulator provided between the metal case and the terminal plate, the second insulator contacting the metal case, wherein
the first insulator is provided between the terminal plate and the sealing rubber, and contacts the terminal plate.

18. The capacitor according to claim 15, wherein the first insulator is provided between the terminal plate and the sealing rubber, and contacts the terminal plate.

19. The capacitor according to claim 15, wherein the first insulator contacts the metal case and the sealing rubber, and extends to between the sealing rubber and the metal case.

20. The capacitor according to claim 15, wherein the first insulator comprises one selected from denatured polypropylene, polypropylene, and polyethylene terephthalate.

21. The capacitor according to claim 15, wherein the first insulator comprises mixture of one selected from butyl rubber, ethylene propylene rubber, and styrene butadiene rubber and one selected from cycloaliphatic petroleum resin, aliphatic petroleum resin, and terpene resin.

22. The capacitor according to claim 15, wherein the first insulator includes
a resin film, and
a rubber layer provided on the resin film, the rubber layer comprising mixture of one selected from butyl rubber, ethylene propylene rubber, and styrene butadiene rubber and one selected from cycloaliphatic petroleum resin, aliphatic petroleum resin, and terpene resin.

23. The capacitor according to claim 22, wherein the resin film of the first insulator comprises one selected from polyethylene, polyethylene terephthalate, polypropylene, polyphenylene sulfide, tetra-fluoro-ethylene perfluoro-alkyl-vinyl-ether copolymer, ethylene fluoride propylene copolymer, polyvinylidene fluoride, ethylene tetra-fluoro-ethylene copolymer, and poly-tetra-fluoro-ethylene.

24. A capacitor comprising:
a metal case having a cylindrical shape having an opening thereof, the metal case having a bent portion at an end of the metal case which is curled inward to the opening and a narrowed portion at which a diameter is reduced locally;
a capacitor element accommodated in the metal case, the capacitor element having a first electrode and a second electrode, the second electrode being electrically connected to the metal case;
an electrolyte accommodated in the metal case;
a terminal plate provided at the opening of the metal case, the terminal plate being electrically connected to the first electrode;
a sealing rubber sealing between the opening of the metal case and the terminal plate while the sealing rubber is compressed by the bent portion of the metal case between the metal case and the terminal plate and between the narrowed portion of the metal case and the opening; and
an insulating ring provided between the metal case and the terminal plate, the insulating ring contacting the metal case and the terminal plate, the insulating ring being disposed between the narrowed portion and the bent portion of the metal case the insulating ring having a cross section having an L-shape; and
an insulator provided between the metal case and the terminal plate, the insulator contacting the insulating ring, the insulator having a thickness ranging from 2 μm to 100 μm, wherein
the terminal plate has a first surface and a second surface, the first surface of the terminal plate facing a side of the metal case, the second surface of the terminal plate facing the capacitor element, and
the insulating ring contacts the first surface and the second surface of the terminal plate.

25. The capacitor according to claim 24, wherein the insulator contacts the metal case and the sealing rubber, and extends to between the metal case and the sealing rubber.

26. The capacitor according to claim 24, wherein the insulator comprises one selected from denatured polypropylene, polypropylene, and polyethylene terephthalate.

27. The capacitor according to claim 24, wherein the insulator comprises mixture of one selected from butyl rubber, ethylene propylene rubber, and styrene butadiene rubber and one selected from cycloaliphatic petroleum resin, aliphatic petroleum resin, and terpene resin.

28. The capacitor according to claim 24, wherein the insulator includes
a resin film, and
a rubber layer provided on the resin film, the rubber layer comprising mixture of one selected from butyl rubber, ethylene propylene rubber, and styrene butadiene rubber and one selected from cycloaliphatic petroleum resin, aliphatic petroleum resin, and terpene resin.

29. The capacitor according to claim 28, wherein the resin film comprises one selected from polyethylene, polyethylene terephthalate, polypropylene, polyphenylene sulfide, tetra-fluoro-ethylene perfluoro-alkyl-vinyl-ether copolymer, ethylene fluoride propylene copolymer, polyvinylidene fluoride, ethylene tetra-fluoro-ethylene copolymer, and poly-tetra-fluoro-ethylene.

30. A capacitor comprising:
a metal case having an opening thereof, the metal case having a bent portion at an end of the metal case which is curled inward to the opening and a narrowed portion at which a diameter is reduced locally;
a capacitor element accommodated in the metal case, the capacitor element having a first electrode and a second electrode, the second electrode being electrically connected to the metal case;
an electrolyte accommodated in the metal case;
a terminal plate provided at the opening of the metal case, the terminal plate being electrically connected to the first electrode; and
a sealing rubber sealing between the opening of the metal case and the terminal plate the sealing rubber being disposed between the narrowed portion and bent portion of the metal case and the sealing plate, and compressed by the bent portion and the narrowed portion of the metal case, wherein:
the terminal plate includes
a first outer edge surface facing the metal case,
a second outer edge surface facing the metal case, the second outer edge surface being closer to the metal case than the first outer edge surface, and
a step surface provided between the first outer edge surface and the second outer edge surface and being connecting the first outer edge surface and the second outer edge surface, and
the sealing rubber contacts the second outer edge surface and the step surface of the terminal plate.

31. The capacitor according to claim 30, wherein the sealing rubber has a cross section having an L-shape.

32. The capacitor according to claim 30, wherein
the terminal plate has a surface facing the capacitor element and has a projection provided on the surface of the terminal plate, and
the first electrode of the capacitor element is electrically connected to the projection of the terminal plate.

33. The capacitor according to claim 30, wherein the sealing rubber includes
a first sealing rubber provided on the second outer edge surface of the terminal plate, and
a second sealing rubber provided on the step surface of the terminal plate.

34. The capacitor according to claim 30, wherein
the terminal plate has a bottom surface facing the capacitor element,
the sealing rubber has a cross section having a squared C-shape and is engaged with to the terminal plate,
the sealing rubber includes
a first portion contacting the second outer edge surface of the terminal plate,
a second portion contacting the step surface of the terminal plate, the second portion of the sealing rubber being connected to the first portion, and
a third portion contacting the bottom surface of the terminal plate, the third portion of the sealing rubber being connected to the second portion, and
a distance between the first portion and the third portion of the sealing rubber is smaller than a distance between the step surface and the inner surface of the terminal plate before the sealing rubber is engaged with the terminal plate.

35. A capacitor comprising:
a metal case having an opening thereof, the metal case having a bent portion at an end of the metal case which is curled inward to the opening and a narrowed portion at which a diameter is reduced locally;
a capacitor element accommodated in the metal case, the capacitor element having a first electrode and a second electrode, the second electrode being electrically connected to the metal case;
an electrolyte accommodated in the metal case;
a terminal plate provided at the opening of the metal case, the terminal plate being electrically connected to the first electrode; and
a sealing rubber sealing between the opening of the metal case and the terminal plat; the sealing rubber being disposed between the narrowed portion and the terminal plate and compressed by the bent portion and the narrowed portion of the metal case, wherein:
the terminal plate has
a first outer edge surface facing the metal case,
a second outer edge surface facing the metal case, the second outer edge surface being closer to the metal case than the first outer edge surface, and
a step surface provided between the first outer edge surface and the second outer edge surface and connecting the first outer edge surface and the second outer edge surface, and
the sealing rubber has a cross section having substantially a rectangular shape before sealing, and contacts the first outer edge surface and the step surface of the terminal plate.

* * * * *